United States Patent
Farchmin et al.

(10) Patent No.: US 7,251,535 B2
(45) Date of Patent: Jul. 31, 2007

(54) LOCATION BASED DIAGNOSTICS METHOD AND APPARATUS

(75) Inventors: David W. Farchmin, Grafton, WI (US); David Alan Vasko, Macedonia, OH (US); Brian A. Batke, Novelty, OH (US); David Michael Callaghan, Concord, OH (US); Scot A. Tutkovics, Sagamore Hills, OH (US); Daniel P. Noonen, Mentor, OH (US); John Joseph Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 533 days.

(21) Appl. No.: 10/774,276

(22) Filed: Feb. 6, 2004

(65) Prior Publication Data

US 2005/0188267 A1 Aug. 25, 2005

(51) Int. Cl.
*G05B 11/01* (2006.01)
*G05B 13/02* (2006.01)
*G06F 17/00* (2006.01)
*G06F 19/00* (2006.01)

(52) U.S. Cl. .......................... 700/26; 700/28; 700/90; 700/96; 700/108; 702/188; 702/189; 702/190; 702/183; 716/25; 709/201; 709/220; 709/221; 709/223

(58) Field of Classification Search ............ 700/26–28, 700/90–97, 99–102, 104–105, 106–108, 700/112, 113, 115; 702/188, 189, 190, 183; 714/25; 709/201, 220, 221, 223

See application file for complete search history.

(56) References Cited

U.S. PATENT DOCUMENTS

| 3,812,947 A | 5/1974 | Nygaard |
| 3,958,111 A * | 5/1976 | Hackett ................ 714/31 |
| 4,309,600 A | 1/1982 | Perry et al. |

(Continued)

FOREIGN PATENT DOCUMENTS

DE 38 32 375 A1 3/1990

(Continued)

OTHER PUBLICATIONS

A Statistical Modeling Approach to Location Estimation; IEEE Transactions on Mobile Computing; vol. 1, No. 1, Jan.-Mar. 2002; p. 59-69; Roos, et al.

(Continued)

*Primary Examiner*—Ramesh Patel
(74) *Attorney, Agent, or Firm*—Quarles & Brady LLP; Alexander M. Gerasimow

(57) ABSTRACT

A method and apparatus for use with a component assembly that forms part of an enterprise and at least one processor, the processor programmed to perform at least one diagnostic process on the assembly and to at least periodically perform at least one summary process on the assembly, the method for commencing the at least one summary process and comprising the steps of specifying at least one triggering relationship between at least a first enterprise user and the assembly that is to initiate the at least one summary process, determining when the at least one triggering relationship occurs and, when the at least one triggering relationship occurs, causing the processor to perform the at least one summary process.

110 Claims, 12 Drawing Sheets

U.S. PATENT DOCUMENTS

| | | | |
|---|---|---|---|
| 4,518,958 A | 5/1985 | Cook et al. | |
| 4,598,275 A | 7/1986 | Ross et al. | |
| 4,612,620 A | 9/1986 | Davis et al. | |
| 4,700,197 A | 10/1987 | Milne | |
| 4,728,959 A | 3/1988 | Maloney et al. | |
| 4,742,470 A | 5/1988 | Juengel | |
| 4,803,039 A | 2/1989 | Impink, Jr. et al. | |
| 5,119,104 A | 6/1992 | Heller | |
| 5,119,401 A | 6/1992 | Tsujimoto | |
| 5,121,331 A | 6/1992 | Lovrenich | |
| 5,202,929 A | 4/1993 | Lemelson | |
| 5,287,266 A | 2/1994 | Malec et al. | |
| 5,347,463 A | 9/1994 | Nakamura | |
| 5,432,702 A | 7/1995 | Barnett | |
| 5,485,634 A | 1/1996 | Weiser et al. | |
| 5,519,878 A | 5/1996 | Dolin, Jr. | |
| 5,544,321 A | 8/1996 | Theimer et al. | |
| 5,548,660 A | 8/1996 | Lemelson | |
| 5,552,806 A | 9/1996 | Lenchik | |
| 5,555,376 A | 9/1996 | Theimer et al. | |
| 5,598,572 A | 1/1997 | Tanikoshi et al. | |
| 5,627,549 A | 5/1997 | Park | |
| 5,642,303 A | 6/1997 | Small et al. | |
| 5,642,353 A | 6/1997 | Roy, III et al. | |
| 5,649,300 A | 7/1997 | Snyder et al. | |
| 5,689,094 A | 11/1997 | Friedli et al. | |
| 5,751,221 A | 5/1998 | Stanfield et al. | |
| 5,825,759 A | 10/1998 | Liu | |
| 5,835,061 A | 11/1998 | Stewart | |
| 5,907,491 A | 5/1999 | Canada et al. | |
| 5,910,799 A | 6/1999 | Carpenter et al. | |
| 5,956,465 A | 9/1999 | Takagi et al. | |
| 5,960,085 A | 9/1999 | de la Huerga | |
| 5,960,341 A | 9/1999 | LeBlanc et al. | |
| 5,978,753 A | 11/1999 | Eidson | |
| 5,991,284 A | 11/1999 | Willenegger et al. | |
| 6,011,487 A | 1/2000 | Plocher | |
| 6,026,304 A | 2/2000 | Hilsenrath et al. | |
| 6,060,993 A | 5/2000 | Cohen | |
| 6,157,368 A | 12/2000 | Fager | |
| 6,167,464 A | 12/2000 | Kretschmann | |
| 6,211,799 B1 | 4/2001 | Post et al. | |
| 6,236,335 B1 | 5/2001 | Goodwin, III | |
| 6,252,867 B1 | 6/2001 | Pfeil et al. | |
| 6,282,455 B1 | 8/2001 | Engdahl | |
| 6,314,337 B1 | 11/2001 | Marcum | |
| 6,321,092 B1 | 11/2001 | Fitch et al. | |
| 6,347,229 B1 | 2/2002 | Zelmanovich et al. | |
| 6,359,711 B1 | 3/2002 | Cole et al. | |
| 6,362,783 B1 | 3/2002 | Sugiura et al. | |
| 6,366,824 B1 * | 4/2002 | Nair et al. | 700/115 |
| 6,377,162 B1 * | 4/2002 | Delestienne et al. | 340/286.07 |
| 6,381,502 B1 | 4/2002 | Rudder et al. | |
| 6,407,719 B1 | 6/2002 | Ohira et al. | |
| 6,418,352 B1 | 7/2002 | Ellis et al. | |
| 6,437,740 B1 | 8/2002 | De Champlain et al. | |
| 6,446,004 B1 | 9/2002 | Cao et al. | |
| 6,453,168 B1 | 9/2002 | McCrady et al. | |
| 6,453,210 B1 | 9/2002 | Belotserkovskiy et al. | |
| 6,496,775 B2 | 12/2002 | McDonald, Jr. et al. | |
| 6,507,762 B1 | 1/2003 | Amro et al. | |
| 6,516,239 B1 | 2/2003 | Madden et al. | |
| 6,546,304 B2 | 4/2003 | Thorvaldsson et al. | |
| 6,574,549 B2 | 6/2003 | Cato et al. | |
| 6,600,418 B2 | 7/2003 | Sainati et al. | |
| 6,600,476 B2 | 7/2003 | Mathis et al. | |
| 6,611,755 B1 | 8/2003 | Coffee et al. | |
| 6,615,094 B2 | 9/2003 | Gleis | |
| 6,618,692 B2 * | 9/2003 | Takahashi et al. | 702/188 |
| 6,665,568 B1 * | 12/2003 | Hott | 700/95 |
| 6,665,581 B2 * | 12/2003 | Nishida et al. | 700/204 |
| 6,694,211 B2 | 2/2004 | Hosel | |
| 6,772,026 B2 * | 8/2004 | Bradbury et al. | 700/98 |
| 6,804,578 B1 | 10/2004 | Ghaffari | |
| 6,813,608 B1 | 11/2004 | Baranowski | |
| 6,839,604 B2 | 1/2005 | Godfrey et al. | |
| 6,895,301 B2 | 5/2005 | Mountz | |
| 6,957,073 B2 | 10/2005 | Bye | |
| 6,993,405 B2 | 1/2006 | Beaulieu et al. | |
| 7,010,379 B2 | 3/2006 | Maske et al. | |
| 7,069,100 B2 | 6/2006 | Monette et al. | |
| 2001/0003443 A1 | 6/2001 | Velazquez et al. | |
| 2001/0005178 A1 | 6/2001 | Stewart | |
| 2001/0018349 A1 | 8/2001 | Kinnunen et al. | |
| 2001/0021182 A1 | 9/2001 | Wakutsu | |
| 2001/0024174 A1 | 9/2001 | Turner | |
| 2002/0007407 A1 | 1/2002 | Klein | |
| 2002/0008621 A1 | 1/2002 | Barritz et al. | |
| 2002/0016655 A1 * | 2/2002 | Joao | 701/35 |
| 2002/0030094 A1 | 3/2002 | Curry et al. | |
| 2002/0051430 A1 | 5/2002 | Kasami et al. | |
| 2002/0058499 A1 | 5/2002 | Ortiz | |
| 2002/0101375 A1 | 8/2002 | Stilp et al. | |
| 2002/0102995 A1 | 8/2002 | Zelmanovich et al. | |
| 2002/0118655 A1 | 8/2002 | Harrington et al. | |
| 2002/0123325 A1 | 9/2002 | Cooper | |
| 2002/0125886 A1 | 9/2002 | Bates et al. | |
| 2002/0131446 A1 | 9/2002 | Metcalf, III | |
| 2002/0161633 A1 | 10/2002 | Jacob et al. | |
| 2002/0167417 A1 | 11/2002 | Wells, II et al. | |
| 2002/0183979 A1 | 12/2002 | Wildman | |
| 2002/0193900 A1 | 12/2002 | Kinoshita et al. | |
| 2003/0011467 A1 | 1/2003 | Suomela | |
| 2003/0013456 A1 | 1/2003 | Bates et al. | |
| 2003/0023882 A1 | 1/2003 | Udom | |
| 2003/0061295 A1 | 3/2003 | Oberg et al. | |
| 2003/0146835 A1 | 8/2003 | Carter | |
| 2003/0191767 A1 | 10/2003 | Kabala | |
| 2003/0197643 A1 | 10/2003 | Fullerton et al. | |
| 2003/0234741 A1 | 12/2003 | Rogers et al. | |
| 2004/0192342 A1 | 9/2004 | Ranganathan | |
| 2004/0203895 A1 | 10/2004 | Balasuriya | |
| 2004/0203930 A1 | 10/2004 | Farchmin et al. | |
| 2004/0235468 A1 | 11/2004 | Luebke et al. | |
| 2004/0260518 A1 | 12/2004 | Polz et al. | |
| 2005/0021158 A1 | 1/2005 | De Meyer et al. | |
| 2005/0035862 A1 | 2/2005 | Wildman | |
| 2005/0038538 A1 * | 2/2005 | McDonald et al. | 700/97 |
| 2005/0071039 A1 * | 3/2005 | Mitrovic | 700/121 |
| 2005/0078297 A1 | 4/2005 | Doemens et al. | |
| 2005/0096776 A1 | 5/2005 | Beaulieu et al. | |

FOREIGN PATENT DOCUMENTS

| | | |
|---|---|---|
| DE | 3832375 A1 | 3/1990 |
| DE | 44 42 443 A1 | 6/1996 |
| DE | 20010529 U1 | 11/2000 |
| DE | 19955646 A1 | 6/2001 |
| DE | 101 42 279 | 3/2003 |
| EP | 0 472 874 A1 | 7/1991 |
| EP | 0 626 635 A2 | 11/1994 |
| EP | 0 992 921 A2 | 4/2000 |
| EP | 1 058 171 A2 | 12/2000 |
| EP | 1 233 315 A1 | 2/2001 |
| EP | 1 265 118 A1 | 6/2001 |
| EP | 1 138 451 A2 | 10/2001 |
| EP | 1 209 930 A2 | 5/2002 |
| EP | 0 801 342 B1 | 1/2003 |
| GB | 2 274 521 | 7/1994 |
| GB | 2 365 662 | 2/2002 |
| GB | 2 372 365 | 8/2002 |
| WO | WO 95/14938 | 6/1995 |
| WO | WO 96/23340 | 1/1996 |
| WO | WO 98/30045 | 7/1998 |

| | | |
|---|---|---|
| WO | WO 99/28797 | 6/1999 |
| WO | WO 99/39219 | 8/1999 |
| WO | WO 00/17737 | 3/2000 |
| WO | WO 00/50919 | 8/2000 |
| WO | WO 01/16607 A2 | 3/2001 |
| WO | WO 01/22118 A2 | 3/2001 |
| WO | WO 01/38897 | 5/2001 |
| WO | WO 01/41546 A2 | 6/2001 |
| WO | WO 01/82032 A2 | 11/2001 |
| WO | WO 02/05107 | 1/2002 |
| WO | WO 02/05107 A1 | 1/2002 |
| WO | WO 02/12992 A2 | 2/2002 |
| WO | WO 02/13557 A1 | 2/2002 |
| WO | WO 02/30053 | 4/2002 |
| WO | WO 02/43428 A1 | 5/2002 |
| WO | WO 02/054813 A1 | 7/2002 |
| WO | WO 02/056274 A1 | 7/2002 |

OTHER PUBLICATIONS

A Probabilistic Approach to WLAN User Location Estimation; International Journal of Wireless Information Networks, vol. 9, No. 3, p. 155-164; Roos, et al.

A Statistical Modeling Approach To Location Estimation; Master's Thesis, Univ. of Helsinki, Department of Computer Science, May 5, 2001, Teemu Tonteri.

An Indoors Wireless Positioning System Based On Wireless Local Area Network Infrastructure (13 pgs), SatNav 2003, Melbourne, Australia Jul. 22-25, 2003, Wang et al.

* cited by examiner

LOCATION BASED DIAGNOSTICS METHOD AND APPARATUS

CROSS-REFERENCE TO RELATED APPLICATIONS

Not applicable.

STATEMENT REGARDING FEDERALLY SPONSORED RESEARCH OF DEVELOPMENT

Not applicable.

BACKGROUND OF THE INVENTION

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

This invention relates generally to diagnostic systems and more specifically to diagnostic systems and methods that perform diagnostic functions at optimal times and that generate diagnostic warnings in an optimal fashion.

Unless indicated otherwise, in order to simplify this explanation, the present invention will be described hereinafter in the context of the industrial automation industry. Nevertheless, it should be appreciated that the present invention includes various methods and apparatus that may be used in any of several different industries including, but not limited to, industrial automation and building automation as well as the medical field and other businesses where electronic and/or mechanical resource operations are analyzed to determine if tell tale signs of interesting conditions (e.g., a likely failure condition or an unexpected condition) occur.

Many industries employ complex automated manufacturing systems that include hundreds and even thousands of different electronic and mechanical resources that are integrated into machine lines for performing manufacturing processes. Most electronic and mechanical resources and systems have an expected useful life after which some or all of the components have to be replaced or repaired. In addition, most resources may malfunction prematurely under certain operating conditions or due to imperfections in the resources when the resources themselves were manufactured.

As with most electronic and mechanical devices, the useful lives of machine line resources can be extended via proper and routine maintenance. To this end, many large manufacturing concerns employ a number of different maintenance engineers charged with routinely maintaining resources. Here, in the case of mechanical resources maintenance may simply include keeping resources well lubricated and periodically replacing worn components. In the case of electronic components and some mechanical components, maintenance may include diagnostically analyzing operating data during normal operation of the resources. For example, for a specific set of resources there may be a range of acceptable operating parameters. A trend over several weeks toward one end or the other of the acceptable range of operating parameters may indicate a likely pending failure of certain components. When a trend is slow, prior experience may indicate that the likely time prior to failure will be relatively long and, when a trend is rapid, experience may indicate that failure is imminent. In some cases diagnostic processes may also include specific operations over and above normal resource operating procedures and analysis of resulting diagnostic data.

Experience generally guides development of diagnostic processes. For example, in the case of a first resource sub-set, experience may indicate that trend data should be obtained and analyzed on a weekly basis to avoid malfunctions and downtime whereas, in the case of a second resource sub-set, experience may indicate that trend data should be obtained and analyzed on a monthly basis.

As the number of manufacturing lines within facilities become greater, the number of diagnostic processes required to service facility resources increases. In addition, as the machine lines become more complex, the complexity of diagnostic processes also often increases. Moreover, as diagnostic results are examined, new diagnostic procedures are often developed that take into account new trends in diagnostic results and, in some cases, normal system operating data.

While diagnostic processes are advantageous and necessary, unfortunately diagnostic requirements increase manufacturing costs appreciably. To this end, large manufacturing concerns often include a large number of different resource types integrated into many different machine lines where the diagnostics required for each of the lines may be unique to the specific machine line. Here, maintenance engineers have to be relatively highly skilled in order to provide services to all lines within a concern's facilities. In addition, in most cases, diagnostic results do not warrant immediate maintenance. Thus, in cases where an engineer has to be present to perform diagnostic processes, if the engineer's presence is not immediately required to address problems related to the diagnostic results, valuable engineer time is wasted.

Many manufacturing concerns have reduced maintenance engineer or technician training requirements by training specific engineers to service specific machine lines and/or resources. For instance, a large manufacturing concern having twenty manufacturing facilities and many buildings at each facility may employ a total of ten maintenance engineers including two engineers in each of five different maintenance classes. Here each engineer need only be versed in maintaining one fifth of the entire set of resources employed by the concern. A specific engineer may routinely work at a different facility each day of a two week cycle and may be on call to address specific unforeseen interesting conditions in any of the facilities when the conditions occur.

To reduce the amount of time engineers have to spend performing routine diagnostic processes, in some cases diagnostic processes have been automated. For example, where a diagnostic process must be performed every week on a resource sub-set, a controller for the resource sub-set may be programmed to automatically perform the process at 5 AM every Monday morning. Similarly, where a process has to be performed every month, the controller may be programmed to automatically perform the process at 5 AM on the first of every month. In these cases either the controller or some other processor is programmed to examine the diagnostic results and, where an interesting condition occurs, to indicate that the interesting condition occurred. In any event, the diagnostic results may be stored for processing via subsequent trend type diagnostic analysis.

Automated diagnostics and multiple classes of maintenance engineers have solved many of the problems associated with maintenance programs. Nevertheless, some shortcomings still exist. For example, where an automatic diagnostic process is performed at 5 AM on the first of every month and a maintenance engineer is in a specific facility on February 27th and is not scheduled to be back in the facility until one week later, if the diagnostic process on March 1 indicates an interesting condition that requires consideration by an engineer, the engineer will have to make an additional and unforeseen trip back to the facility on March 1. In addition to wasting travel time, the additional trip may also throw off the engineer's regular schedule.

As another example, when an interesting condition is identified, often a signal is sent to a central facility or concern monitoring or service station which then contacts an engineer to resolve the condition. Here, in most cases, a monitoring employee must assess the situation, identify a qualified engineer to address the condition and then issue a work request of some type to the engineer. This process requires that the monitoring employee be familiar with engineer qualifications which is not always the case—especially in the case of large concerns where engineer and monitoring employee turnover may be routine.

In addition, at any given time there is usually a specific engineer within the sub-set of qualified engineers that is optimal for addressing a specific interesting condition and known systems fail to enable the monitoring employee to identify the optimal engineer. In this regard, all other things being equal, the qualified engineer that is currently least busy should address an occurring interesting condition. Similarly, all other things being equal, the qualified engineer that is currently closest to the location of the interesting condition should address the occurring interesting condition. In addition, all other things being equal, if an interesting condition occurs at a facility location where a qualified engineer is scheduled to be within a short period to perform other maintenance duties, that engineer may be the optimal engineer to address the condition. Known current systems do not enable a monitoring employee to optimally assign tasks to maintenance engineers as a function of various factors such as proximity, qualifications, availability, etc.

One other problem that has been recognized with existing diagnostic systems is that often there are broad location related trends that cannot be appreciated at the resource level. To this end, where a rash of interesting conditions occurs within a specific area of a facility there may be some environmental cause (e.g., temperature, excess humidity, magnetic field, etc.) that is affecting resource operations. Current known systems have no way of grouping together location based interesting conditions.

Yet one other problem with addressing diagnostically interesting conditions is related to mobile resources. One recent trend in manufacturing resources is to provide resources that are rapidly reconfigurable so that many different products can be manufactured using different integrated resource subsets or so that one resource may be used at different times with different resource sub-sets. For example, a dryer machine may be wheeled between several facility locations to be used at different times with different plastic molding resource sub-assemblies. Here, where interesting conditions are noticed to service stations, known systems fail to provide a mechanism for determining which of several different stations should receive notice of interesting conditions associated with the mobile resource.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that optimal timing for performing diagnostic processes can be tied to the occurrence of triggering circumstances that periodically occur within a facility. For instance, in at least some cases it has been recognized that it is optimal to perform diagnostics when a facility employee (e.g., a maintenance engineer) is proximate an assembly such that, if an interesting condition occurs, the engineer can address the interesting condition. More specifically, in some cases it is optimal to perform diagnostics only when a maintenance engineer that is qualified to address possible interesting conditions is proximate an assembly and is available (i.e., is not performing other processes for at least some period) to address conditions that may occur. As another instance, where a schedule indicates that an engineer will be proximate an assembly at a specific future time and that the engineer will be available for at least a period, it may be optimal to perform diagnostics at that time and to therefore automatically schedule diagnostic processes for that time. Other optimal triggering circumstances or relationships are contemplated.

Moreover, it has been recognized that where diagnostic summary processes are periodically performed (e.g., every other Monday morning at 5 A.M.), when an interesting condition occurs, information regarding engineer qualifications (i.e., the types of interesting conditions that the engineer is trained to address), locations, availability, perceived urgency of the condition, etc., can be used to identify and then, in at least some cases, notify an optimal engineer of the condition. In some cases where a condition is not urgent a system may automatically amend the schedule of an engineer to add an interesting condition thereto in an optimal fashion.

Consistent with the above comments, at least some embodiments of the present invention include method for use with an enterprise operation and at least one processor programmed to perform at least one diagnostic process on the operation and to at least periodically perform at least one summary process on the operation, the method for commencing the at least one summary process and comprising the steps of specifying at least one triggering relationship between at least a first enterprise user and the operation that is to initiate the at least one summary process, determining when the at least one triggering relationship occurs and when the at least one triggering relationship occurs, causing the processor to perform the at least one summary process.

In at least some embodiments the at least one triggering relationship specifies a first relative juxtaposition of the operation and the first enterprise user. Here, the method may further include the steps of monitoring a period since the last performance of the at least one summary process, performing the at least one summary process at least once every Y hours independent of the occurrence of the at least one triggering relationship and, after the at least one triggering relationship occurs, resetting the period.

In some cases the method may further include the step of monitoring the period since the last performance of the at least one summary process wherein the at least one triggering relationship specifies that the at least one summary process should be performed when the first user and the assembly are in the first relative juxtaposition and when the period since the last performance of the at least one process exceeds X hours.

At least some of the inventive methods include a method for use with a component assembly that forms part of an enterprise and at least one processor, the processor programmed to perform at least one diagnostic process on the assembly and to at least periodically perform at least one summary process on the assembly, the method for commencing the at least one summary process and comprising the steps of specifying at least a first relative juxtaposition of the assembly and a qualified enterprise user that is to initiate the at least one summary process wherein the qualified user is any user that is qualified to use the results of the at least first summary process, determining when at least one qualified user is in the at least first relative juxtaposition with respect to the assembly and when at least one qualified user is in the at least first relative juxtaposition with respect to the assembly, causing the processor to perform the at least one summary process.

Some inventive methods include a method for use with a plurality of devices that are spaced out within a facility, the method for identifying when at least one interesting condition occurs within the facility and comprising the steps of specifying at least a first pattern of diagnostically interesting incidences that correspond to the at least one interesting condition where the at least a first pattern is at least in part related to relative juxtapositions of the diagnostically interesting incidences, performing diagnostic processes related to each of the devices and identifying diagnostically interesting incidences, when a diagnostically interesting incident is identified, identifying the relative juxtapositions of the identified incident with respect to at least a sub-set of previously identified diagnostically interesting incidences, comparing the relative juxtapositions to the at least a first pattern and where the relative juxtapositions match the at least a first pattern, indicating that the first pattern has occurred.

According to one aspect of the invention some embodiments include a method for use with a component assembly that forms part of an enterprise and at least one processor linked to the assembly, the method for requesting service from a most optimal enterprise user when at least one interesting condition related to the component assembly occurs, the method comprising the steps of monitoring the assembly for at least one diagnostically interesting condition, when at least one diagnostically interesting condition is identified, identifying at least one of the enterprise users as the most optimal user to address the diagnostically interesting condition and indicate the most optimal user.

According to one other aspect some embodiments of the invention include a method for use with an assembly to be located within an enterprise, the method for associating the assembly with an optimal service resource for reporting diagnostically interesting incidences related to the assembly, the method comprising the steps of positioning at least first and second service resources within the enterprise, positioning the assembly within the enterprise, identifying an optimal one of the at least first and second service resources for monitoring assembly operations based at least in part on the relative juxtaposition of the assembly to each of the first and second service resources, monitoring the assembly for the occurrence of at least one diagnostically interesting incident and when a diagnostically interesting incident occurs, indicating the incident to the optimal one of the first and second service resources.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
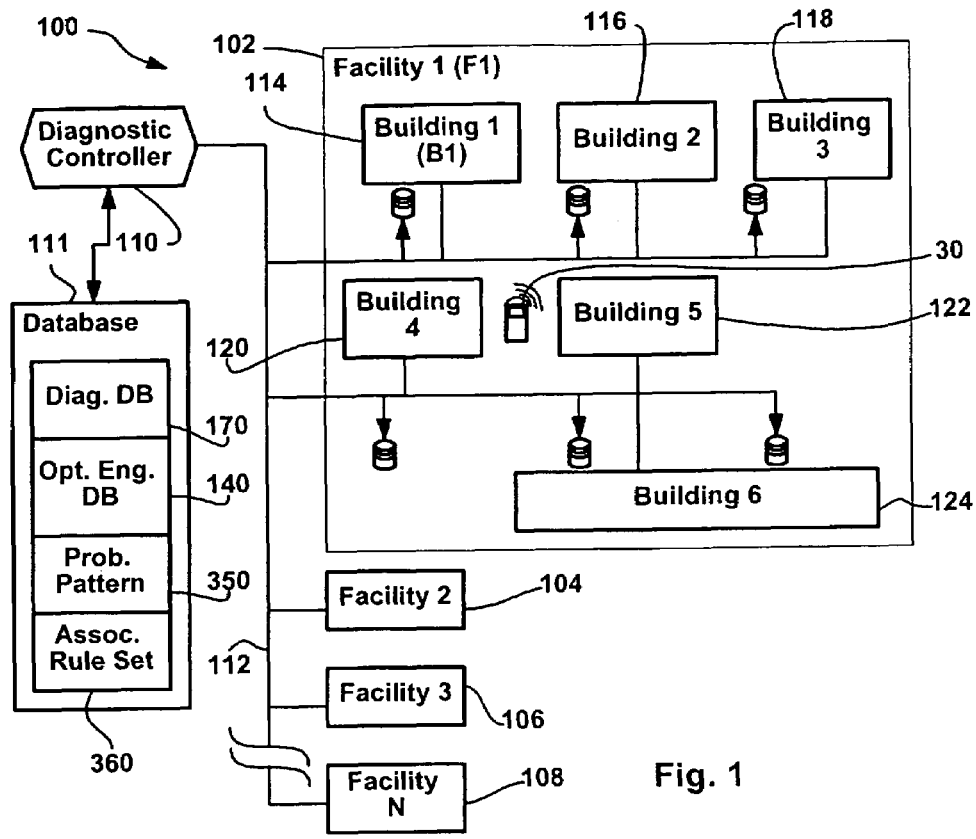
FIG. 1 is a schematic diagram illustrating an enterprise according to one embodiment of the present invention.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numbers correspond to similar elements throughout the several views and, more specifically, referring to FIG. 1, the present invention will be described in the context of an exemplary, albeit simplified, set 100 of related manufacturing facilities 102, 104, 106, 108, etc. Hereinafter, unless indicated otherwise, set 100 will be referred to as an enterprise 100. Each facility includes a number of different buildings. For example, a first facility 102 includes six separate buildings 114, 116, 118, 120, 122 and 124 that are arranged on a campus that comprises facility 102. Although no detail is shown for the other facilities 116–124, here it is assumed that each of the other facilities includes at least one, and in many cases, several separate buildings. In some cases it is contemplated that one or more facilities may not include buildings but, instead, may include outdoor space.

In the present example, the buildings in each facility 102–108 each include machines or mechanical and electrical resources that are integrated together to form various automated assemblies or machine lines for performing manufacturing processes. To this end, referring to FIG. 2, a simplified schematic plan view of exemplary building 114 is illustrated. Here it is assumed that the plan views of each of the other buildings in FIG. 1 would be similar to the view of building 114 in FIG. 2. In the interest of simplifying this explanation only the plan view of the first building 114 will be described in detail.

First building 114 includes a rectilinear facility floor space or area 13 confined by four facility walls collectively identified by numeral 12. In the exemplary building 114, entire area 13 comprises a single room (i.e., there are no wall partitions within building 114 and all of the building resides on a single level). A doorway 16 is provided to allow access to area 13.

Exemplary building 114 includes ten separate automated assemblies identified by labels M1 through M10. The exemplary automated assemblies M1 through M10 may include any type of manufacturing assembly such as a mill, a drill, a transfer line, a laser cutting device, a vision system, any of several different types of robots, clamps, etc., or any combination of cooperating components. The automated assemblies M1 through M10 are shown as being different sizes to visually illustrate that the automated assemblies may have different physical footprints. For example, assembly M4 is illustrated as having a much larger physical footprint than assembly M8. In general, automated assemblies M1–M10 are spaced out within area 13 although, in some cases, automated assemblies may be positioned directly next to each other such as, for instance, assemblies M7 and M8.

It is contemplated that each of automated assemblies M1–M10 includes at least one and, in many cases, a plurality of sensing devices (not illustrated) that sense assembly operating characteristics and provide signals that can be used to facilitate assembly monitoring via an interface (i.e., a WID). For instance, in the case of a drilling assembly, sensors may include limit switches that are tripped when a drill slide reaches various positions along a travel path, on/off switches, speed sensing switches, motor operating characteristic sensors, etc. It is also contemplated that most if not all of assemblies M1–M10 will include a plurality of actuators for causing the assembly components to perform assembly functions.

Figure 2:
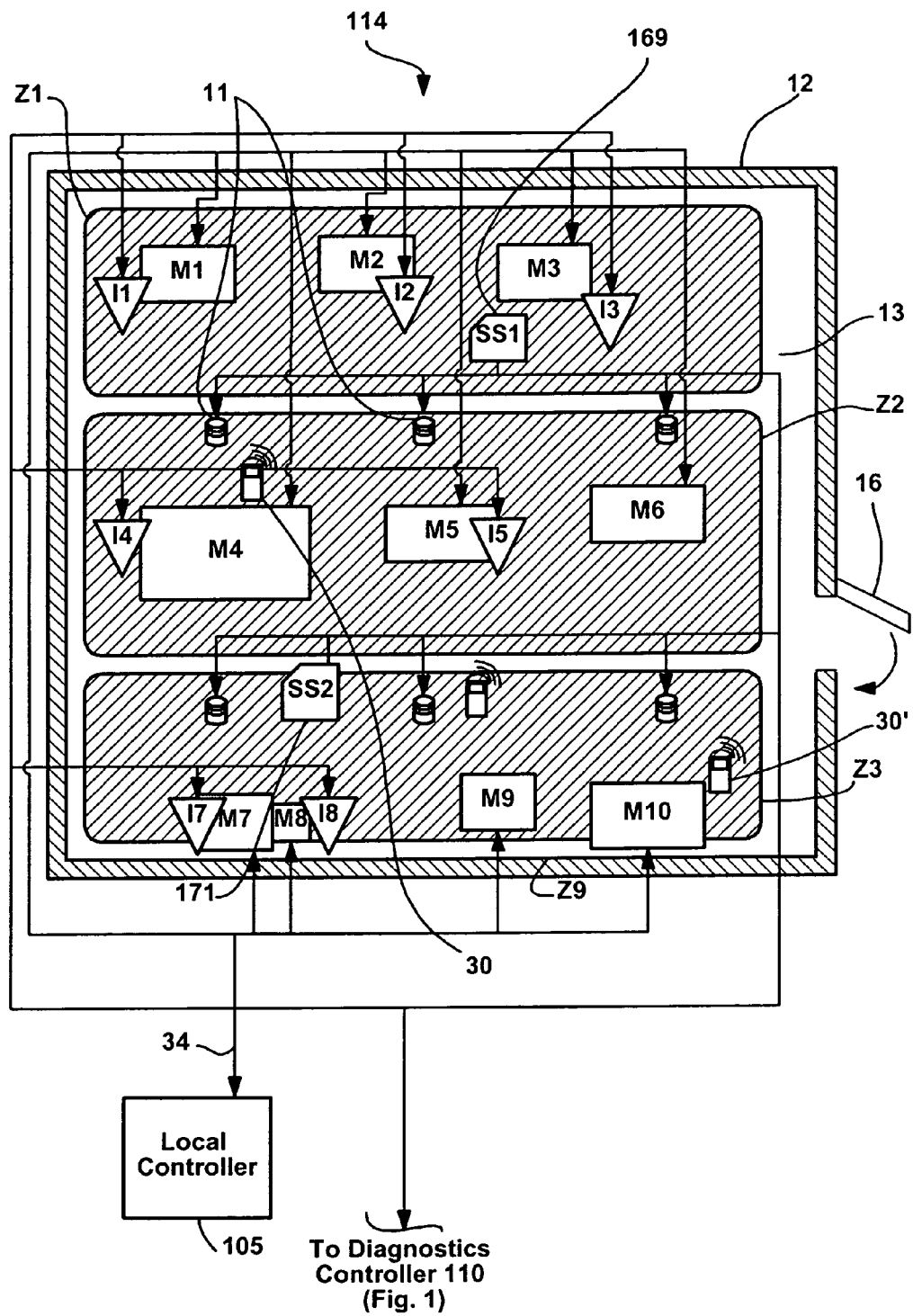
FIG. 2 is a schematic diagram illustrating one of the buildings in FIG. 1 and associated assemblies and other components according to one aspect of the present invention.

In addition to including sensing devices and actuators, it is contemplated that most, if not all, of automated assemblies M1–M10 will include some type of control interface to facilitate control and control adjustment. For example, again, in the case of a drilling assembly, drill slide stroke length may be altered, drill speed may be altered, the angle at which a drill bit enters a work piece may be altered, etc. In FIG. 2 human-machine interfaces are referred to by labels I1 through I8 where HMIs are shown next to assemblies that the HMIs are associated with. For instance, HMI I1 is associated with assembly M1, HMI I2 is associated with assembly M2, and so on.

In addition to the components described above, building 114 also includes a plurality of communication sensors or access points 11 (only two numbered), a local server/controller 105, at least one wireless information device (WID) 30, a plurality (two illustrated) of service stations 169 and 171 and a two-way data bus 34 (e.g., LAN, Ethernet, etc.) linked to controller 105 that form a network.

Controller 105 may be positioned within building 114 or may be located at some remote location such as, for instance, in a separate building within first facility 102 or at a completely different location such as a remote facility (e.g., 104) associated with building 114 and within enterprise 100. In FIG. 2, controller 105 is typically linked to at least some components in each of automated assemblies M1–M10 via two-way data bus 34 that allows controller 105 to monitor assembly operating characteristics as well as control assembly operation. For instance, in some cases controller 105 may be linked via an Ethernet connection 34 to a proximity sensor that is part of assembly M1 and to an actuator that is part of assembly M3, and so on.

Controller 105 is a processor based workstation capable of running various types of computer programs. For instance, some programs are assembly control programs that enable controller 105 to either separately control each assembly M1–M10 or, safely and precisely, sequence assembly operation thereby allowing relatively complex manufacturing processes to be performed in an efficient manner. In addition, other controller programs may allow controller 105 to derive various assembly operating characteristics from monitored or sensed characteristics (e.g., motor voltage and current data is useful to derive stator and rotor resistance estimates, system inductances, identify harmonics, determine system torques, etc.).

Moreover, controller 105 is programmed to run complex diagnostic processes and algorithms to generate diagnostic data and then to identify operating trends, alarm conditions, potentially hazardous conditions, maintenance requirements, raw material requirements and so on as a function of the diagnostic data. Furthermore, controller 105 may also run programs that facilitate data management and warehousing so that subsequent diagnostic algorithms may be applied to warehoused data to identify historical operating patterns for various purposes. When potentially hazardous conditions occur, controller 105 may be programmed to cause the automated assemblies M1–M10 to assume non-hazardous operating conditions (e.g., a reduced set of operations or, in some cases, a state in which all mechanical components are parked).

Controller 105 may also run programs designed to facilitate interfacing with facility operators (e.g., maintenance personnel, process engineers, etc.) thereby providing control capabilities and system monitoring capabilities. To this end, controller 105 may include its own input and output interfacing devices such as a display screen, a keyboard, a pointing and selecting device such as a mouse or trackball or any other types of interfacing devices known in the art. In the present example it is assumed that a separate controller 105 is located within each of the facility buildings that is programmed to run building and assembly specific diagnostic processes either routinely or periodically for assemblies that are located within the specific building.

In the present example it is assumed that each of HMIs I1–I8 also facilitates interfacing with facility operators thereby providing at least some level of control and system monitoring. To this end, HMIs I1–I8 are linked to controller 105 via data bus 34 so that monitored information can be shared therebetween and so that some level of proximate control can be accessed near at least a sub-set of the assemblies. Thus, for instance, controller 105 may monitor all operating characteristics of assembly M1 and may publish data related thereto for access by HMI I1 so that interface I1 needn't separately monitor the same information. Similarly, controller 105 may perform some information analysis and publish the results for use by interface I1. In addition, because HMIs I1–I8 are linked to controller 105 and controller 105 controls assemblies M1–M10, each HMI I1–I8 can also be used to control an associated assembly via bus 34 and controller 105. While at least some HMIs may be linked directly to associated assemblies M1–M10 for monitoring and control purposes, hereinafter it will be assumed that each HMI I1–I8 accesses data and facilitates control via controller 105.

Two service stations 169 and 171 are spaced apart within building 114 and are linked to controller 105 via data bus 34. Each service station 169 and 171 typically includes at least a work station of some type. Usually a facility employee will be stationed at each station to monitor at least a sub-set of assembly operations within building 114. Referring again to FIG. 1, in some cases a single service station (not identified in FIG. 1) in one of the facility buildings may be programmed to monitor resources in a subset of the facility buildings 114 through 124. Here, the employee at a station may monitor assembly operations to identify any "interesting conditions" that may occur such as, for instance, malfunctioning assemblies, unexpected operations, depleted raw material levels, etc.

When an interesting condition is identified, it is contemplated that facility 102 or enterprise 100 will have some specific protocol designed for dealing with the condition. For instance, in some cases the protocol may be for the monitoring employee to notify a maintenance engineer that an interesting condition has occurred. In other cases the protocol may require the monitoring employee to initiate additional diagnostic procedures to generate more information about the interesting condition. Other protocols are contemplated.

Referring still to FIG. 2, each communication access point 11 includes a two-way wireless transceiver that, as well known in the computer arts, is capable of transmitting and receiving electromagnetic (e.g., radio or infrared) signals within an area proximate the transceiver. Wireless transceivers like access points 11 are well known in the industry and therefore, in the interest of simplifying this explanation, will not be described here in detail. For the purposes of the present invention, it should suffice to say that each transceiver 11 transmits information signals which decrease in strength as distance from the transceiver increases. In the illustrated example, six separate access points 11 are provided within area 13 and are generally equi-spaced within area 13. Typically, access points 11 will be mounted on the ceiling within an area 13 to allow relatively unobstructed communication between an access point 11 and other devices that communicate therewith. While access points 11 are illustrated as being substantially equi-spaced within area 13, it should be appreciated that other access point arrangements are contemplated and that, in many cases, other access point arrangements may be most suitable given specific assembly layouts, the physical characteristics of each assembly and assembly zone layouts (described below).

Controller 105 is linked to each access point 11 via two-way data bus 34 that allows controller 105 to receive information from the access points 11 and also allows controller 105 to provide information to each of the access points 11 for transmission within area 13 to WIDs or the like.

Information transmitted from each access point 11 to controller 105 is typically tagged by the access point so that controller 105 can determine which access point 11 provided the received information. This tagging may either be performed by the access point 11 earmarking data packets with an access point identifier (e.g., an access point number) or, in the alternative, may be facilitated by simply providing separate hardwires from each of the access points 11 to the controller 105. In a similar fashion, controller 105 and access points 11 are configured such that controller 105 can address information to each separate and specific access point 11.

Referring still to FIG. 2, according to at least one embodiment of the present invention, sub-spaces within area 13 are earmarked or identified as diagnostic zones or locations associated with different sets of automated assemblies M1–M10 wherein, when a WID 30 (i.e., a person carrying a WID) is within the zone, some diagnostic process may be performed. The exemplary different zones Z1 through Z3 in FIG. 2 are identified by hatched rectilinear blocks. For instance, a space identified by label Z1 includes approximately the upper one third of space 13 as illustrated in FIG. 2, a space labeled Z2 including approximately the middle one third of space 13 and a space Z3 including approximately the lower one third of space 13. In some cases, each of the assemblies that reside within a zone may be diagnostically associated therewith. For instance, in FIG. 2 assemblies M1 M2, M3 may be associated with zone Z1 while assemblies M7, M8, M9 and M10 are associated with zone Z3.

Although not illustrated, in some cases, no diagnostic zones may be specified for one or more of the facility automated assemblies. Moreover, some zones that are associated with specific automated assemblies may not be immediately adjacent the associated automated assemblies but instead may be separated from the associated automated assemblies. Some zones may include all or a part of other zones and, in fact, in some cases, a zone may include an entire building or facility (e.g., 102 in FIG. 1).

In the example that follows, it will be assumed that assembly M1 is diagnostically associated with zone Z1, assembly M2 is diagnostically associated with entire building 114 (i.e., B1) (see again FIG. 1) and that assembly M3 is diagnostically associated with the entire first facility 102 (i.e., F1).

Referring again to FIGS. 1 and 2, bus 34 is linked to a single communication network 112 (e.g., an Ethernet, a local area network (LAN), a wide area network (WAN), etc.) and thereby to a remote diagnostic controller 110. As its label implies, diagnostic controller 110 is programmed to manage all diagnostic processes that occur within enterprise 100. To this end, controller 110 runs one or several algorithms to determine when diagnostic processes should be performed and, when a specific procedure should be performed for a specific assembly, controller 110 transmits commands to the local controller 105 associated with the specific assembly thereby causing the local controller 105 to perform the process.

In addition, in at least some embodiments of the invention, diagnostic controller 110 is also programmed to manage maintenance scheduling as a function of results of diagnostic processes. To this end, once diagnostic data has been generated, either one of the local controllers 105 or the diagnostic controller may analyze the data to identify any interesting conditions. Where a local controller identifies an interesting condition the local controller publishes the condition via network 112 and diagnostic controller 110 receives the publication off the network 112. When an interesting condition occurs, controller 110 is, in at least some embodiments, programmed to identify an optimal engineer to address the condition and then notifies the optimal engineer.

Referring still to FIG. 1, in at least some embodiments, a plurality of access points 11 are also spaced apart throughout each of the separate facilities 102, 104, etc. and are linked to network 112. Here, one of the controllers linked to network 112 may be programmed to perform a WID locating process to track WID locations within each of the facilities. For instance, in some cases, one of the local controllers 105 may be responsible for tracking WID locations outside the buildings and within the facilities 102 through 108. In other cases diagnostics controller 110 may be programmed to track WID locations within enterprise 100 and outside the buildings.

Figure 5:
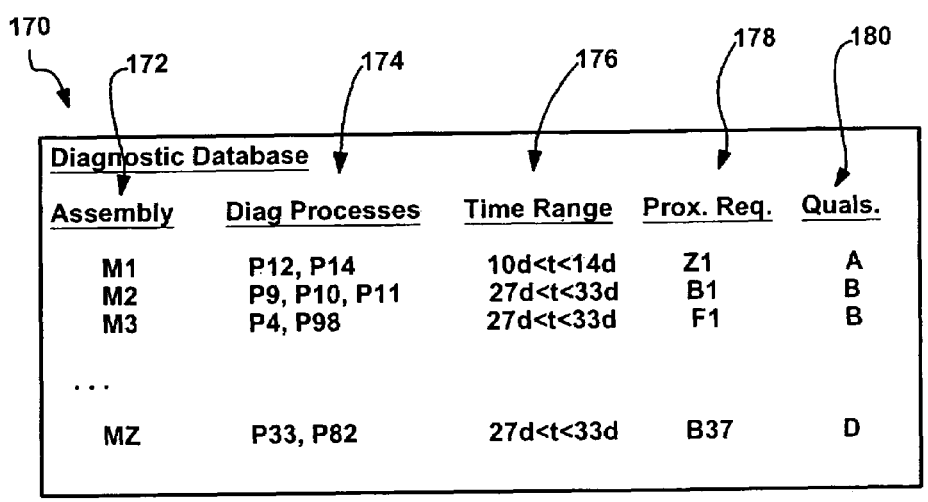
FIG. 5 is a diagram of a diagnostics database according to one aspect of the present invention.
Figure 4:
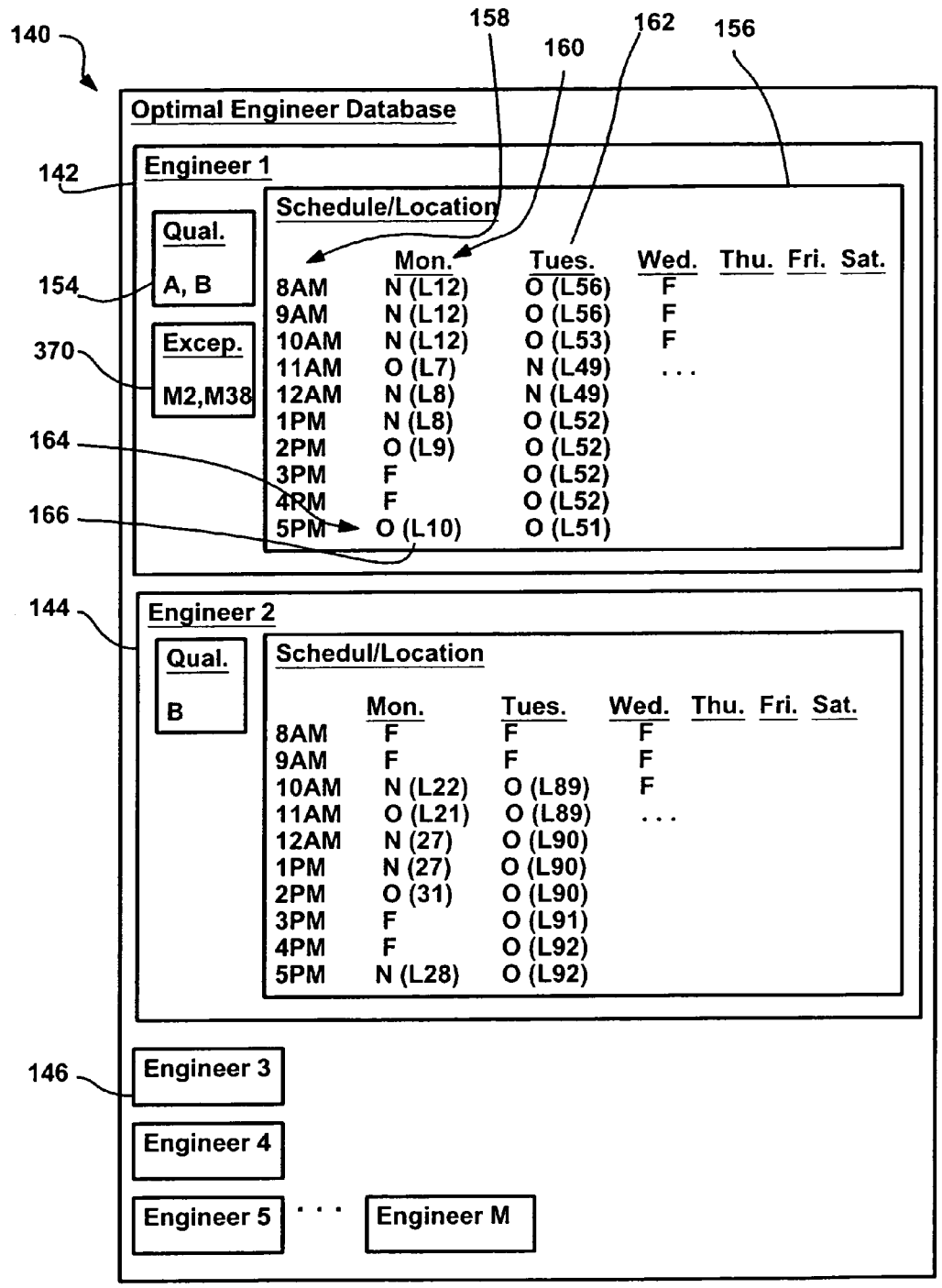
FIG. 4 is a diagram illustrating an optimal engineer database according to one aspect of the present invention.

To manage diagnostic processes, controller 110 is linked to a database 111 that, in at least some embodiments, includes four sub-databases 170, 140, 350 and 360. Referring also to FIGS. 4 and 5, two of the sub-databases are a diagnostics database and an optimal engineer database identified by numerals 170 and 140, respectively. Diagnostics database 170 includes information that specifies diagnostic processes that are to be performed for each of the automated assemblies and specific sets of circumstances that trigger when the diagnostic processes are to be performed. Herein, in at least some cases, the triggering sets of circumstances include some specific spatial relationship between a facility employee and a specific automated assembly and therefore, the circumstance sets are generally referred to as triggering relationships. For instance, an exemplary triggering relationship may specify that an associated diagnostic process for assembly M1 should be performed whenever a facility employee enters zone Z1 (see again FIG. 2) or that a process for assembly M2 should be performed whenever a facility employee enters building B1. Many other and more complex triggering relationships are contemplated, a sampling of which are described in greater detail below.

Referring still to FIG. 5, diagnostics database 170 includes an assembly column 172, a diagnostic processes column 174, a time range column 176, a proximity requirement column 178 and a qualifications column 180. Assembly column 172 lists each of the assemblies or machines M1, M2, M3, etc. that reside within enterprise 100.

For each assembly in column 172, diagnostics column 174 lists a set of diagnostic processes associated therewith. For instance, for assembly M1, column 174 lists processes P12 and P14. Here, each of processes P12 and P14 may be very simple or, in some cases may be extremely complex. For instance, process P12 may require an assembly to actually halt normal operations, perform some sequence of mechanical machinations and/or measurements, perform an algorithm on the measurements, analyze the algorithm and, when an interesting condition occurs, report the interesting condition in some fashion. As another instance, diagnostics may be routinely performed by assembly M1 and, process P14 may simply include reporting the results of the diagnostic process in some fashion. Many other diagnostic processes are contemplated.

Referring still to FIG. 5, time range column 176 specifies a time range that indicates specific time periods during which each of the diagnostic processes in column 174 should be performed. In column 176 a "t" indicates the beginning of a timing period and "d" indicates days. The time range for processes P12 and P14 associated with assembly M1 is between 10 and 14 days after the most recent performance of those processes (i.e., 10d<t<14d). Thus, if processes P12 and P14 were performed on May 1, processes P12 and P14 next must be performed on any one of the days between May 11 and May 15 including May 11 and May 15. Similarly, the time range for processes P9, P10 and P11 associated with assembly M2 is between 27 and 33 days after the most recent performance of those processes (i.e., 27d<t<33d).

Referring still to column 176, while a single time range is specified for each sub-set of processes associated with each of the assemblies in column 172, in at least some cases different time ranges will be specified for each of the processes associated with a specific assembly. For instance, a first time range may be specified for process P12 in column 174 for assembly M1 while a second and different time range may be specified for process P14 in column 174 for assembly M1.

Proximity requirement column 178 indicates a relative juxtaposition of an employee to the assembly in column 172 that will trigger the processes in column 174 if the time range criteria in column 176 is met. Thus, for instance, referring also to FIG. 2, when an employee is located within zone Z1 during the time range (10d<t<14d—see also column 176 in FIG. 5), processes P12 and P14 may be performed by or on assembly M1. Similarly, when an employee is located within building B1 during the time range (27d<t<33d—see column 176 in FIG. 5), processes P9, P10 and P11 may be performed by or on assembly M2. In column 178, "F" indicates a facility so, for instance, F1 indicates the first facility 102 in FIG. 1.

Referring still to column 178, while a single proximity requirement is specified for each sub-set of processes associated with each of the assemblies in column 172, in at least some cases different proximity requirements will be specified for each of the processes associated with a specific assembly. For instance, a first proximity requirement may be specified for process P12 in column 174 for assembly M1 while a second and different proximity requirement may be specified for process P14 in column 174 for assembly M1.

Qualifications column 180 indicates a specific set of qualifications that an employee must have in order for a triggering relationship to occur. In this regard, it is recognized that not all facility employees will be trained to address all interesting conditions that occur within the facility set 100. Thus, in at least some embodiments of the invention, diagnostic processes will only be triggered when a qualified employee is juxtaposed within the location specified by an associated proximity requirement in column 178. In column 180 different sets of interesting conditions that may occur for a specific assembly are identified by different capital letters (e.g., A, B, C, etc.). Thus, for instance, for assembly M1, the set of potential interesting conditions that may occur is identified as set A. Similarly, for assembly M2, the set of potential interesting conditions that may occur is identified as set B. Here, set A may include a plurality (e.g., 10, 20, etc.) of separate interesting conditions where one or a sub-set of the interesting conditions may occur at any time. In some cases the interesting conditions may be listed independently in database 170 and each may be separately considered when identifying an optimal engineer.

While a simplified diagnostics database is illustrated in FIG. 5, it should be appreciated that other types of diagnostic databases are contemplated, some of which may be even simpler than database 170 and some of which may be more complex. For example, in at least some cases, it is contemplated that the only qualification for triggering a diagnostic process may be that an employee meets the proximity requirement (column 178) for a specific set of processes. In this case, a simplified version of database 170 would suffice that does not include the time range and qualifications columns 176 and 180, respectively. Similarly, in some cases it may be that an additional triggering characteristic is that the employee that is qualified and that meets the proximity requirements in column 178 within the time range specified by column 176 must be "available" to address interesting conditions if they occur. Here, if the employee meeting the other criteria in database 170 has a completely booked schedule that cannot be altered, it may make no sense to perform a diagnostic process since, even if an interesting condition occurs, the employee would not be able to address the condition. Here, an additional column may be added to database 170 that indicates whether or not availability to address conditions is a factor in determining if processes should be performed.

Referring now to FIG. 4, optimal engineer database 140 includes information related to specific engineers that are employed by enterprise 100 to address interesting conditions as they occur within the enterprise 100. More specifically, a separate sub-database is provided for each of the employed engineers, three of the sub-databases identified by numerals 142, 144 and 146. Each of the sub-databases is similar and therefore, unless indicated otherwise, in the interest of simplifying this explanation, only sub-database 142 is described here in detail.

Sub-database 142 includes two separate sections, a qualifications section 154 and a schedule/location section 156. Qualifications section 154, as the label implies, indicates one or more qualification sets that the specific engineer has that are related to addressing the results of diagnostic processes (e.g., P12, P14, etc.) and, in a fashion similar to that in column 180 of database 170, distinguishes qualification sets by capital letters A, B, etc. Here, as above, the capital letters indicate sets of interesting conditions that the specific engineers have been trained to address. Thus, for instance, the first engineer associated with sub-database 142 is qualified to address each of the interesting conditions in each of sets A and B. Referring also to FIG. 5, because diagnostic processes P12 and P14 require an engineer qualified to address the interesting condition set A, (see column 180 in FIG. 5), the first engineer would be qualified to address the results of processes P12 and P14. However, referring still to FIG. 4, the second engineer associated with sub-database 144 is only qualified to address the interesting conditions in set B and therefore would not be qualified to address the results of processes P12 and P14.

Referring still to FIG. 4, as its label implies, schedule/location database section 156 includes indicators related to the engineer's weekly schedule. To this end, section 156 includes a table having a time slot column 158 and a series of day columns 160, 162, etc. Time slot column 158 identifies the different hours of a work day in separate rows. The exemplary column 158 divides a typical work day by hours from 8 AM to 5 PM. Each of the day columns is assigned to a different day of the work week from Monday through Saturday where the Monday and Tuesday columns are independently identified by numerals 160 and 162, respectively.

Within each of the day columns information is inserted for each of the time slots in column 158. The information in each of the day columns is similar and therefore, unless indicated otherwise, only information in column 160 is described here in detail. Referring specifically to the entry in column 160 that is aligned with the 5 PM time slot in column 158, the exemplary entry includes two types of information. First, the entry includes an indication 164 of whether or not the specific engineer is available at the specific time on the specific day. Here, three separate indicators are used to indicate different levels of availability. A first indicator "F" indicates that the engineer is free or unoccupied during the specific time slot. A second indicator "N" indicates that the engineer is occupied during the time slot and that the engineer's schedule cannot be altered because the tasks assigned during that slot have to be completed during that specific time. A third indicator "O" indicates that the engineer is occupied during that time slot but that the engineer's schedule may be altered during the specific slot because the tasks assigned to the engineer during the specific slot are not time sensitive. In the 5 PM time slot for the Monday column 160 the indicator "O" 164 indicates that the first engineer is occupied but that the engineer's schedule may be altered.

Referring still to FIG. 4, second, the entry in column 160 for the 5 PM time slot indicates the location at which the engineer is scheduled to be during the specific time slot. In the example the location 166 is indicated as L10 which would be a specific location within enterprise 100. Where an engineer is free during a time slot no location information is provided—here proximity to the most recent location may be assumed in some cases.

As in the case of the diagnostics database 170, it is contemplated that the optimal engineer database 140 may take many other forms and may be either more complex or, in some cases, more simple than the form illustrated and described above.

Figure 3A:
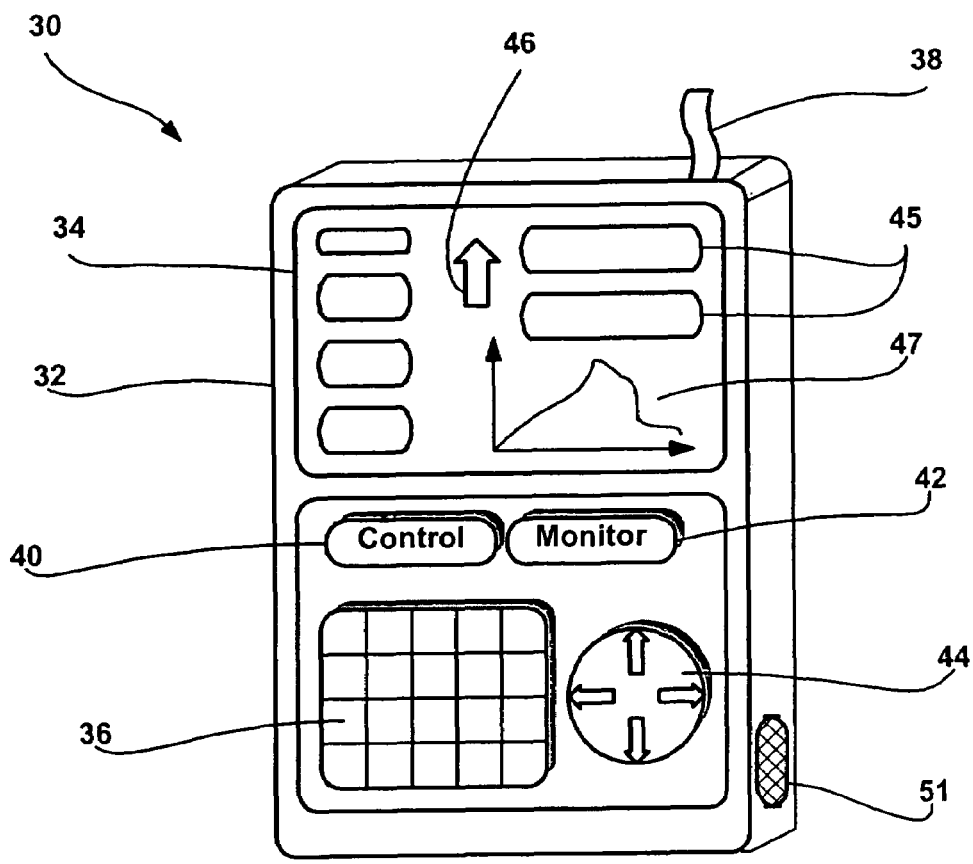
FIG. 3*a* is a perspective view of an exemplary wireless information device (WID) that may be used to facilitate some inventive methods.
Figure 3B:
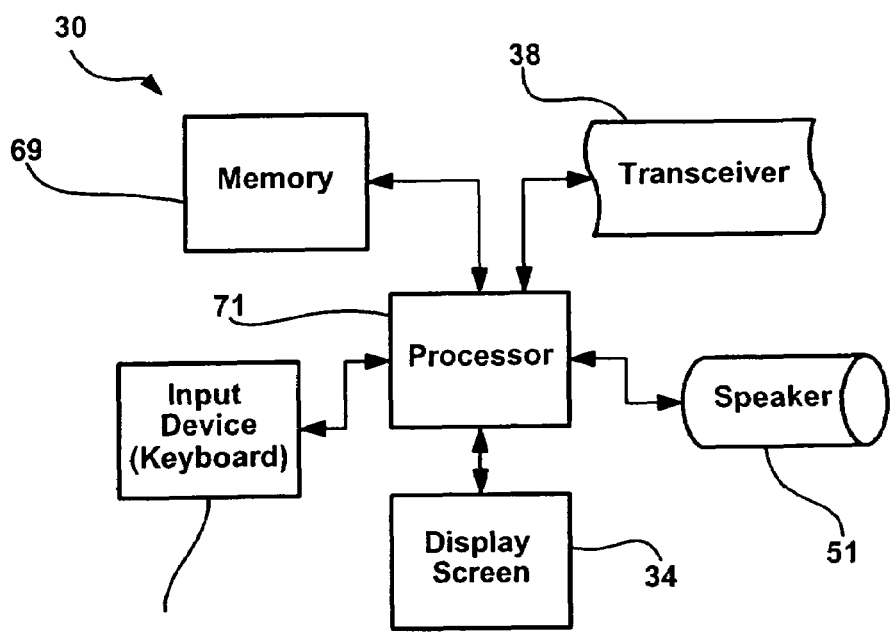
FIG. 3*b* is a schematic diagram illustrating various components of the WID of FIG. 3*a*.

Referring now to FIGS. 3*a* and 3*b*, a first relatively simple exemplary WID 30 is illustrated. Exemplary WID 30 includes, generally, a plurality of components that are mounted within a hardened plastic or metallic housing identified by numeral 32. WID 30 components include a processor 71, an input device (e.g., keyboard 36), a display screen 34, a speaker 51 for audio output, a transceiver 38 and a memory 69. Processor 71 is linked to each of the input device, display screen 34, speaker 51, transceiver 38 and memory 69 for communication therewith. Processor 71 is equipped to run various programs for both displaying information via screen 34 and for receiving control signals and communicating those control signals to access points 11 (see again FIGS. 1 and 2) via transceiver 38.

The input device may include any of several different types of input components including a typical push-button keyboard 36, separate selection buttons 40 and 42, a rocker-type selection button 44, and/or selectable icons that may be provided via display screen 34 such as, for instance, icons 45. It is contemplated that, in at least one embodiment, a pointing cursor 46 may be movable about screen 34 and placed over one of the selectable icons (e.g., 45) after which a conventional type mouse clicking action may be used to select one of the icons to cause some display or control function to occur. In other embodiments display 34 may comprise a touch screen where icons are selectable via a stylus or the tip of an operators finger.

Display screen 34 may be any type of conventional display screen suitable for a handheld device and, for example, may be equipped to display numeric information, icons, graphs such as graph 47, bar charts, or any other type of monitoring and control information that may be associated with facility machines. Speaker 51 is a conventional small audio output speaker which may be used for any purpose such as providing an audible indication when a WID 30 is removed from a zone, providing operating characteristics in an audible manner, etc.

Transceiver 38 is mounted proximate the top end of housing 32. As in the case of the transceivers that comprise access points 11, transceiver 38 is capable of transmitting electromagnetic signals and also receiving such signals so that information can be provided to controller 105 or received from controller 105 via access points 11.

Memory 69 stores the programs performed by processor 71 and also, in at least some embodiments of the invention, stores a WID identifier (e.g., a WID number, a WID user identification number, etc.). It is contemplated that some WIDs 30 may only be configured to provide access information and, in this case, the programs stored in memory 69 may only be access type programs. Where a WID 30 is equipped with control capabilities, control programs are stored in memory 69.

Hereinafter a number of different methods that are consistent with various aspects of the present invention are described. While all of the methods have some similar characteristics, each is different and each generally has its own level of complexity. In this regard, as indicated above, some of the methods may employ all of the information in the diagnostic database 170 and the optimal engineer database 140 and indeed may employ additional information while other methods may only employ a sub-set of the information in databases 140 and 170. Where only a sub-set of the information in the databases is required, obviously, simplified databases 140 and 170 may be employed and, where additional information is required for one of the methods, a more complex set of databases is required.

Here it should be recognized that, while some diagnostic controllers 110 in certain systems may be programmed to perform only one of the methods described hereinafter, in other systems, the diagnostic controller 110 may be programmed to perform different methods for different automated assemblies and under differing circumstances. Thus, referring to FIGS. 1 and 2, while diagnostic controller 110 may perform a relatively simple procedure to determine whether or not a diagnostic process should be performed for assembly M1, controller 110 may perform a relatively complex procedure to determine whether or not the diagnostic processes associated with assembly M2 should be commenced and may perform an even more complex process to determine if diagnostics should be performed for assembly M7.

Generally, herein, it is contemplated that the processes hereinafter may be performed in parallel for each of the assemblies (e.g., M1, M2, etc.) within enterprise 100. To simplify this explanation, unless indicated otherwise, the methods hereinafter will be described in the context of assembly M1 and data in diagnostics database 170 related thereto. Similarly, unless indicated otherwise, the methods will be described in the context of the first engineer associated with sub-database 142 illustrated in FIG. 4.

Moreover, while many different ways for determining the locations of engineers within enterprise 100 are contemplated, the exemplary invention will be described in the context of a system wherein each engineer is issued a handheld WID 30 (see again FIGS. 3a–3b) and where the WIDs 30 and access points 11 generate data used by either the local controllers (e.g., 105 in FIG. 2) or by diagnostics controller 110 in FIG. 1 to determine WID and hence engineer location. Where controllers 105 determine WID locations that information is published via network 34–112 and is obtained by controller 110. Referring again to FIG. 2, in the present example, it is contemplated that when a WID 30 is activated within an enterprise building (e.g., 114) or, for that matter, within any of the enterprise facilities 102–108, signals will be transmitted from one of the WIDs 30 and at least a subset of the access points 11 to the other of the WID 30 and the access point subset that are then useable via any of several well known methods to determine the location of the WID within the area in questions (e.g., the facilities, the building, etc.). The location determining method may be based on signal strength or time of flight triangulation or, in some cases, a statistical analysis of received or generated data.

Figure 6:
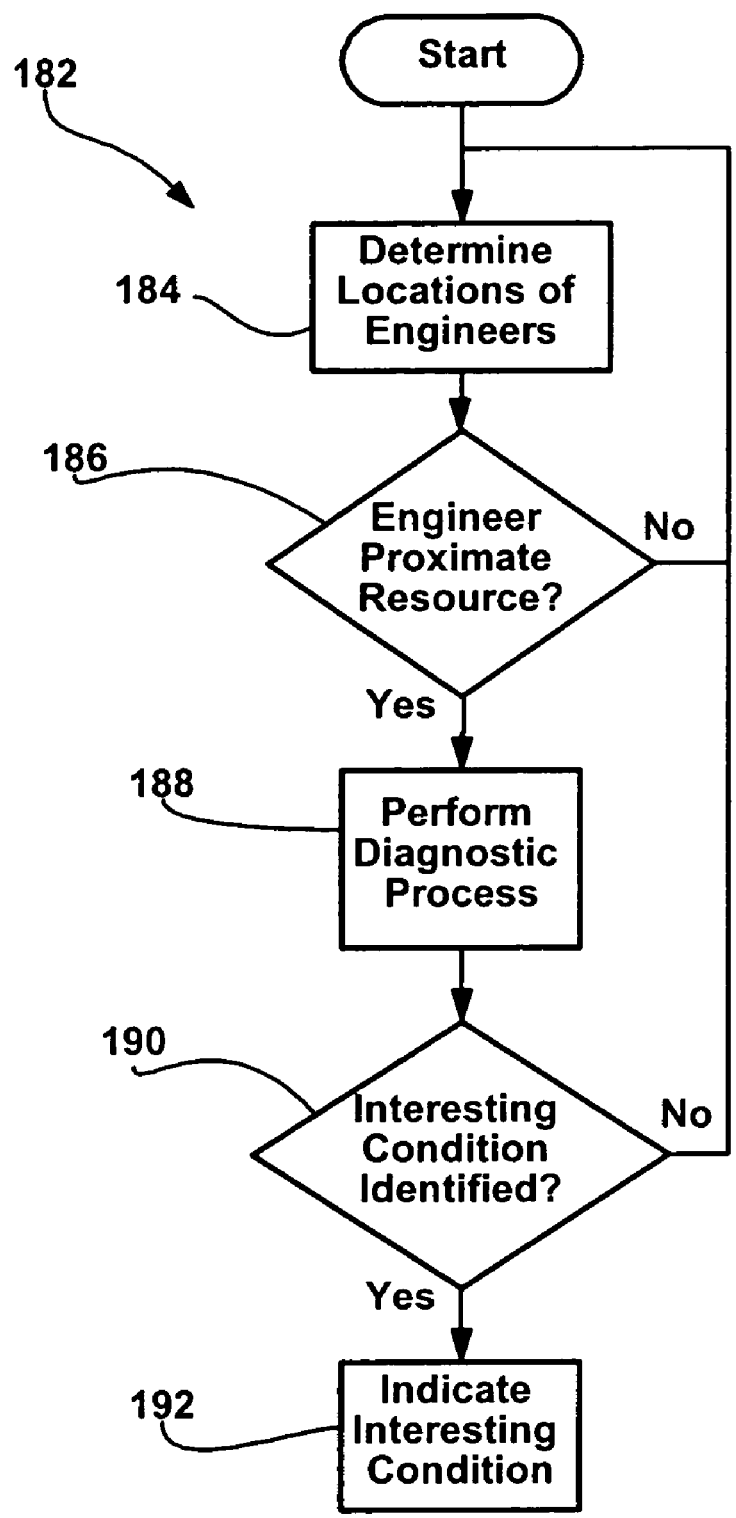
FIG. 6 is a flow chart illustrating a simple method according to one aspect of the present invention.

Referring now to FIG. 6, one simplified method 182 that is consistent with certain aspects of the present invention is illustrated. Method 182 describes a process whereby diagnostics controller 110 determines whether or not a simple triggering relationship between any of the facility set engineers and a specific automated assembly occurs and, when the triggering relationship occurs, causes diagnostic processes for the specific assembly to be performed. Thereafter, when the results of the diagnostic process are consistent with any interesting condition, the interesting condition is indicated in some fashion.

Referring still to FIG. 6 and to FIGS. 1 and 2, at block 184 diagnostic controller 110 determines the locations of all of the engineers within enterprise 100. Referring also to FIG. 5, the proximity requirement in column 178 for resource M1 in column 172 is that a WID be located within zone Z1. Therefore, at block 186, controller 110 determines whether or not a WID 30 is within zone Z1. Where no WIDs are within zone Z1, control passes back up to block 184 where the process described above is repeated. Where at least one WID is located within zone Z1, control passes to block 188 where controller 110 causes the diagnostic processes identified in column 174 (e.g., P12 and P14) be performed. At block 190, controller 110 analyzes the results of the diagnostic processes to determine if an interesting condition has occurred. Where no interesting conditions have occurred, control passes back up to block 184. Where an interesting condition has occurred at block 190, control passes to block 192. At block 192, controller 110 indicates that an interesting condition has occurred. Here, blocks 190 and 192 may comprise part of the diagnostic processes. In some cases blocks 190 and 192 and other sub-processes similar thereto will be referred to as summary processes as they summarize the end diagnostic results.

Indication of an interesting condition can take any of several different forms including sending a message to one of the service stations 169, 171 to indicate that an interesting condition has occurred. Thereafter, a monitoring employee at the service station may either choose to ignore the interesting condition or dispatch one of the facility engineers to address the interesting condition. Where an employee is to be dispatched to address the interesting condition, in many cases, because of the proximity of the employee whose WID was sensed within zone Z1, the employee within zone Z1 should be dispatched. Dispatch may simply include transmitting a message to the appropriate employee via the employee's WID. In some cases, controller 110 may indicate an interesting condition by automatically transmitting a message to the employee within zone Z1 indicating that an interesting condition has occurred and the specific location at which the interesting condition has occurred along with additional information that may be required by or useful to the dispatched engineers.

Figure 7:
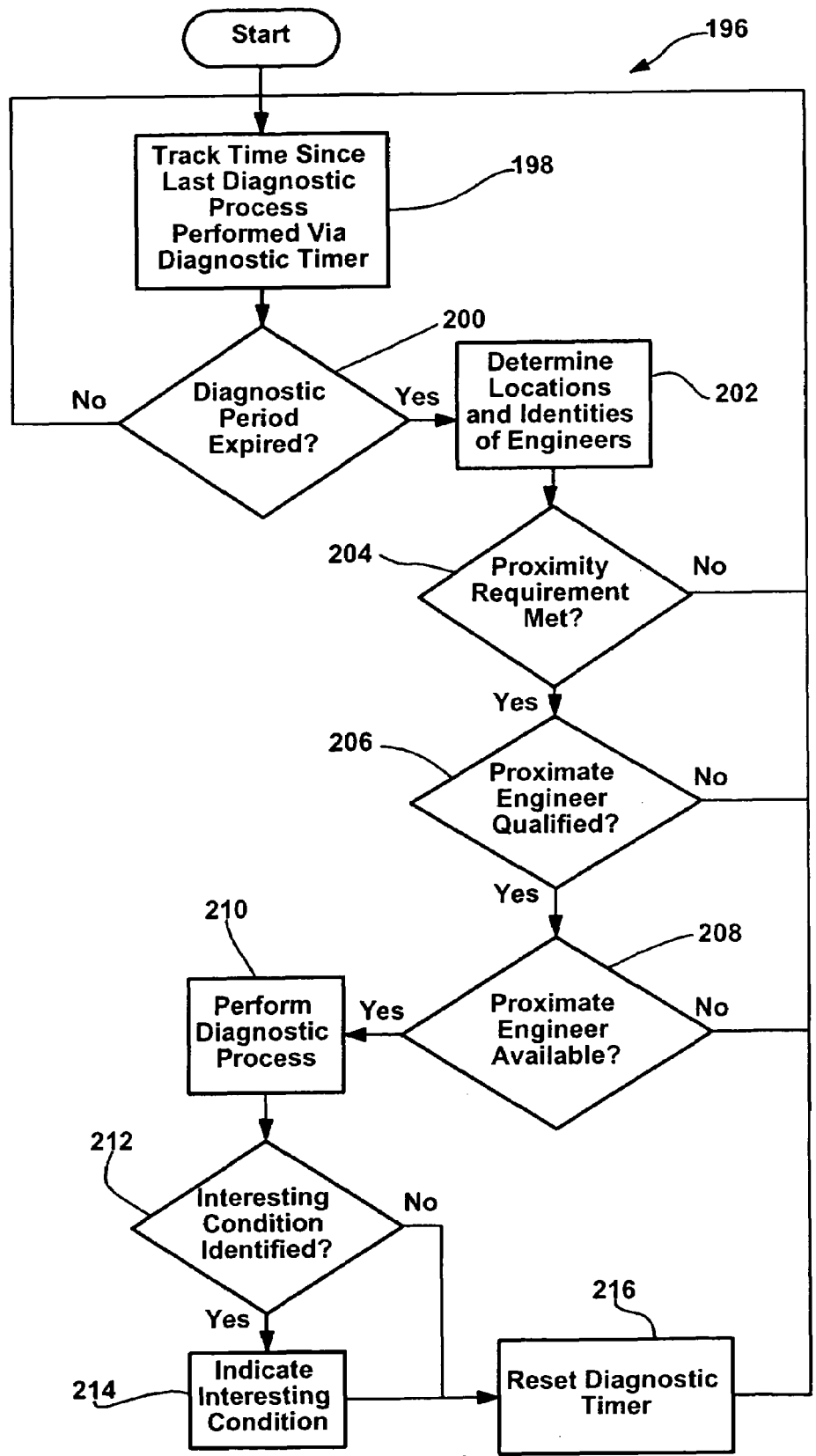
FIG. 7 is similar to FIG. 6, albeit illustrating a more complex method according to the present invention.

Referring now to FIG. 7, a more complex method 196 is illustrated where the triggering relationship includes several requirements. Specifically, in FIG. 7, the diagnostic controller 110 (see again FIG. 1) triggers diagnostic processes only when an engineer having specific qualifications required to address diagnostic results is in a juxtaposition such that his position meets the proximity requirements for a specific assembly and the engineer meets the proximity requirements within the time range specified in column 176 of database 170 (see again FIG. 5) for the specific assembly. Thus, referring once again to FIG. 5 and, more specifically to the row of information corresponding to assembly M1, when an engineer having qualification set A is within zone Z1 within the time range of between ten and fourteen days since the last time the diagnostic processes P12 and P14 were performed for assembly M1, the triggering relationship exists and diagnostic controller 110 causes diagnostic processes P12 and P14 to again to be performed.

Referring still to FIG. 7 and also to FIGS. 1, 2 and 5, at block 198 diagnostic controller 110 tracks the time since diagnostic processes P12 and P14 were last performed for assembly M1 via a time counter. Thus, if diagnostic processes P12 and P14 were last performed for assembly M1 eleven days ago, the time counter indicates a time of eleven days and some hours since the most recent diagnostic process performance. At block 200, diagnostic controller 110 compares the time tracked by the time counter with the time range specified in column 176 for the specific diagnostic processes. Where the time counter duration is not within the specified time range, control passes back up to block 198 and the process continues to loop. At block 200, when the time counter duration is within the time range specified in column 176, control passes to block 202. At block 202, diagnostic controller 110 determines the locations and identities of the engineers within enterprise 100. At block 204, controller 110 access the proximity requirement information in column 178 corresponding to assembly M1. In the present example, the proximity requirement requires that a WID be located within zone Z1. Where no WID is located within zone Z1, control passes back up to block 198. Where at least one WID is located within zone Z1, control passes to block 206.

At block 206, controller 110 accesses column 180 in database 170 and determines the qualifications required of an engineer to address the diagnostic results associated with processes P12 and P14 in column 174. Next, at block 206, controller 110 access optimal engineer database 140 and, more specifically, the sub-database of database 140 that corresponds to the engineer whose WID is currently located within zone Z1. Here it will be assumed that the first engineer corresponding to sub-database 142 is the engineer whose WID is located in zone Z1 and therefore, controller 110 accesses sub-database 142. More specifically, controller 110 accesses the qualifications section 154 of sub-database 142 and, at block 206, compares the qualifications in section 154 with the qualifications in column 180. Where the qualifications in section 154 are different than the qualifications in column 180, control passes back up to block 198 where the process described above is repeated. However, at block 206, where the qualifications in section 154 are identical to the qualifications in column 180, control passes to block 208. In the present example, the qualifications in column 180 corresponding to assembly M1 include set A and at least one of the sets of qualifications in section 154 for the first engineer also includes set A and therefore, control passes to block 208.

At block 208, controller 110 accesses the schedule/location section 156 of sub-database 142 for the first engineer to determine whether or not the first engineer is available to address any interesting conditions that may result from performance of diagnostic processes P12 and P14 at the current time. Here, for example, if the current time is 8:00 a.m., as illustrated in column 160 of section 156, the first engineer is not available (i.e., an "N" is in column 160). Where the first engineer is not available to address possible interesting conditions, control again passes back up to block 198. However, referring again to column 160 in FIG. 4, if the time is 3:00 P.M. and therefore the first engineer is free to address possible interesting conditions (i.e., an "F" is in column 160), control passes from block 208 to block 210 where controller 110 causes diagnostic processes P12 and P14 to be performed.

After block 210, control passes to block 212 where controller 110 determines whether or not any interesting conditions have occurred. Where no interesting conditions have occurred, control passes to block 216 where the diagnostic process time counter is reset to zero after which control passes back up to block 198 and the process above is repeated. Referring once again to block 212, where an interesting condition does occur, control passes to block 214 where the interesting condition is again indicated after which control passes to block 216.

Once again, indication of the interesting condition can take any of several different forms including transmitting an indication of the interesting condition to the first engineer via the engineer's WID, transmission of some type of indication to a service station or the like, etc.

Here, it should be appreciated that, in at least some embodiments, where no interesting condition occurs, the entire process described above will be done behind the scenes and the first engineer will have no indication that the process every occurred. However, where an interesting condition does occur and the first engineer is qualified to address the condition and has the time to address the condition, the engineer will be notified of the condition and will be able to address the condition. In some cases, even when no interesting condition occurs, some type of notice may be provided to a proximate and "triggering" engineer via the engineer's WID thereby affirmatively confirming for the engineer that the diagnostic process triggering method is operating properly.

Referring once again to FIG. 5, it is contemplated that, in some cases, the triggering relationship specified by database 170 may not occur within the time range specified in column 176. In this case, where the diagnostic processes in column 174 have to be performed periodically and, at least once within the longest duration specified by the time range, in at least some cases, if the longest duration specified by the time range occurs prior to the triggering relationship occurring, diagnostic controller 110 will automatically cause the diagnostic processes in column 174 to be performed. Thus, for instance, referring once again to the row of information correspond to assembly M1 in column 172, if the triggering relationship specified by columns 176, 178 and 180 does not occur prior to fourteen days since the last time diagnostic processes P12 and P14 were preformed, controller 110 automatically performs processes P12 and P14. In this case, if at least one interesting condition is identified after processes P12 and P14 have been performed, controller 110 may perform some type of indicating process.

Figure 8:
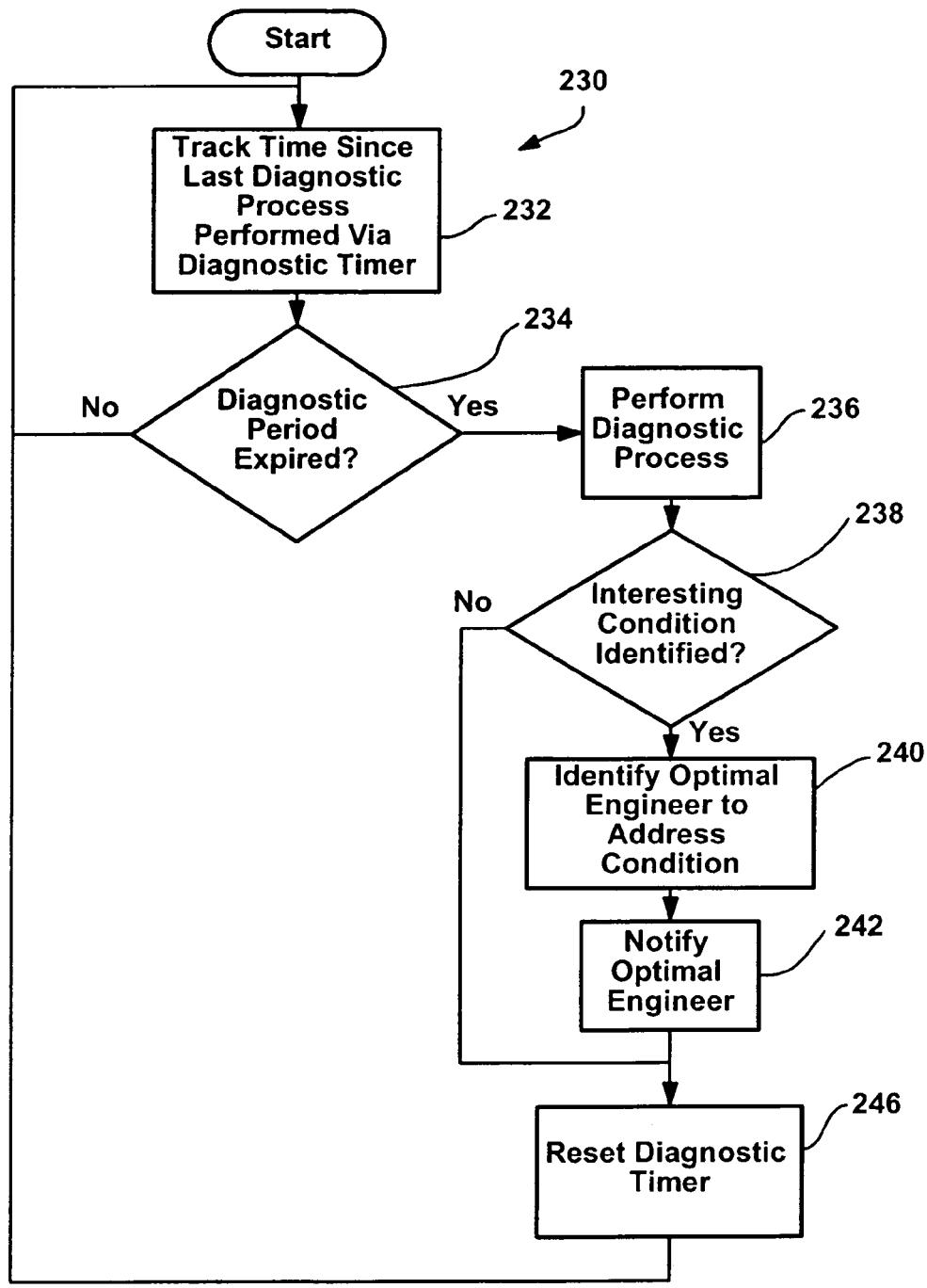
FIG. 8 is another flow chart illustrating yet another method according to the present invention.

Referring now to FIG. 8, a method 230 consistent with the comments above and that may run either separately or in parallel with one of the methods described above is illustrated. Method 230, is a method for, when a diagnostic process is performed and at least one interesting condition is identified, providing notification to an optimal enterprise engineer so that the interesting condition can be optimally addressed. To this end, referring also to FIGS. 1 and 2, at process block 232, controller 110 tracks the time since the last diagnostic process was performed, again using the time counter described above. At block 234, controller 110 determines whether or not the time limit specified by the time range in column 176 has occurred. Prior to the time limit occurring, control passes back up to block 232. After the time limit is reached, control passes to block 236. In the present example, with respect to assembly M1, the maximum limit of the time range specified in column 176 is fourteen days. Therefore, after fourteen days since the most recent performance of diagnostic processes P12 and P14, control passes to block 236. At block 236, controller 110 performs the diagnostic processes P12 and P14. At block 238, controller 110 determines whether or not any interesting conditions have been identified in the diagnostic processes results. Where no interesting conditions have occurred, control passes to block 246 where the time counter is reset to zero and restarted.

Referring once again to block 238, where an interesting condition does occur, control passes to block 240 where controller 110 identifies the optimal engineer to address the interesting condition. At block 242, controller 110 notifies the optimal engineer that the interesting condition has occurred after which control passes to block 246 and the time counter is again set to zero and restarted. After block 246, control passes again to block 232 where the time counter duration is again monitored.

Figure 9:
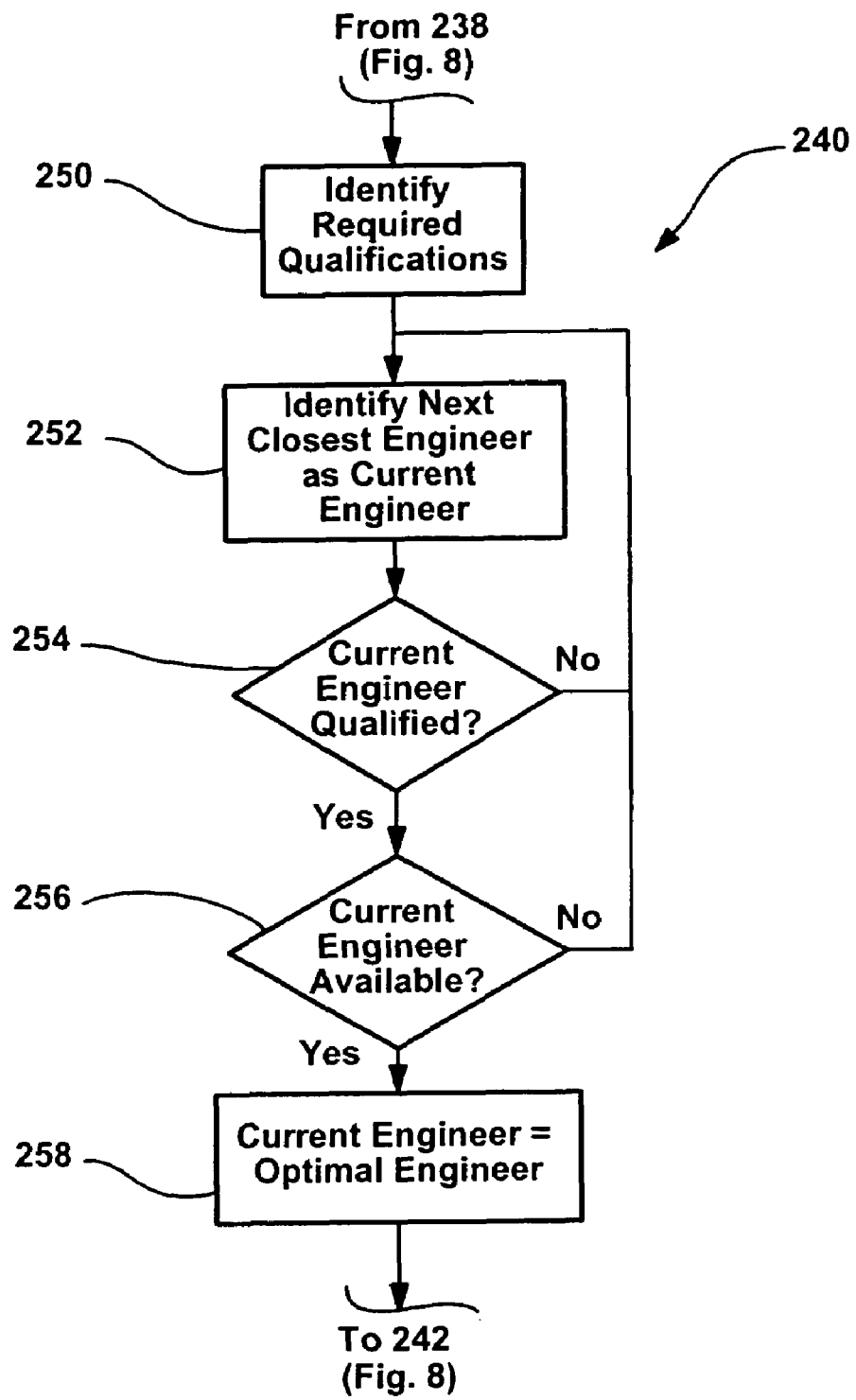
FIG. 9 is a sub-process that may be substituted for a portion of the process illustrated in FIG. 8.

Many different sub-processes for identifying the optimal engineer to address identified interesting conditions are contemplated, some of which are very complex and others of which are relatively simple. Referring now to FIG. 9, one exemplary sub-process that may be used to replace process block 240 in FIG. 8 is illustrated. Referring also to FIG. 8, after an interesting condition occurs at block 238, according to the sub-process of FIG. 9, control passes to block 250 where controller 110 identifies the qualification requirement set corresponding to the expired time range in column 176. In the present example, qualification set A corresponds to the expired time range associated with assembly M1. After block 250, control passes to block 252.

At block 252 controller 110 identifies the next closest engineer as a current engineer. In this case, for example, referring again to FIG. 2, where only two engineers using WIDs are located within space 13 and the first engineer is proximate assembly M4 (see WID 30 in FIG. 2) while the second engineer is proximate assembly M10 (see WID 30' in FIG. 2), controller 110 identifies the first engineer as the current engineer because the first engineer is the closest engineer to assembly M1. Continuing, at block 254, controller 110 determines whether or not the current engineer is qualified. In this regard, controller 110 accesses the sub-database corresponding to the current engineer and specifically the qualifications section of that sub-database and compares the qualifications of the current engineer to the qualifications from column 180. Where the current engineer is not qualified to address the interesting conditions for the specific assembly, control passes back up to block 252 and controller 110 identifies the next closest engineer as the current engineer. In the example above, where the first engineer is proximate assembly M4 and a second engineer is proximate assembly M10 in FIG. 2, if the first engineer is not qualified at block 254, the next time through block 252 controller 110 selects the second engineer proximate assembly M10 (i.e., the engineer associated with WID 30) as the current engineer and control loops back down to block 254. In the present example it will be assumed that the first engineer is qualified as consistent with the example above and therefore control passes to block 256.

Referring still to FIGS. 1, 2, 4, 5 and 9, at block 256, controller 110 determines whether or not the current engineer is available to address the interesting condition by accessing the optimal engineer database 140 and, more specifically schedule/location section 156 thereof. Where the current engineer is not available, control again loops back up to block 252 where controller 110 again identifies the next closest engineer as the current engineer and the process described above is repeated. Eventually, at block 256, one of the engineers will be identified as current and available and at that point, control will drop to block 258.

At block 258, the current engineer is set equal to the optimal engineer. After block 258 control passes back to block 242 in FIG. 8 where the optimal engineer is notified of the interesting condition so that the engineer can address the condition.

In some cases, an interesting condition may not be urgent and, in these cases, it may be preferable to wait until an available qualified engineer is scheduled to be within the general location in which the interesting condition occurs so that existing schedules for engineers do not have to be altered more than necessary. To this end, FIG. 10 illustrates a sub-process 240 that may be used to replace a portion of the process of FIG. 8 described above wherein, when an interesting condition occurs, when the interesting condition is urgent, the closest qualified and available engineer is notified of the condition and, when an interesting condition is not urgent, the next qualified engineer that is available and that will next meet the proximity requirement is notified via an amendment to the engineer's schedule to add an interesting condition thereto to be addressed.

Figure 10:
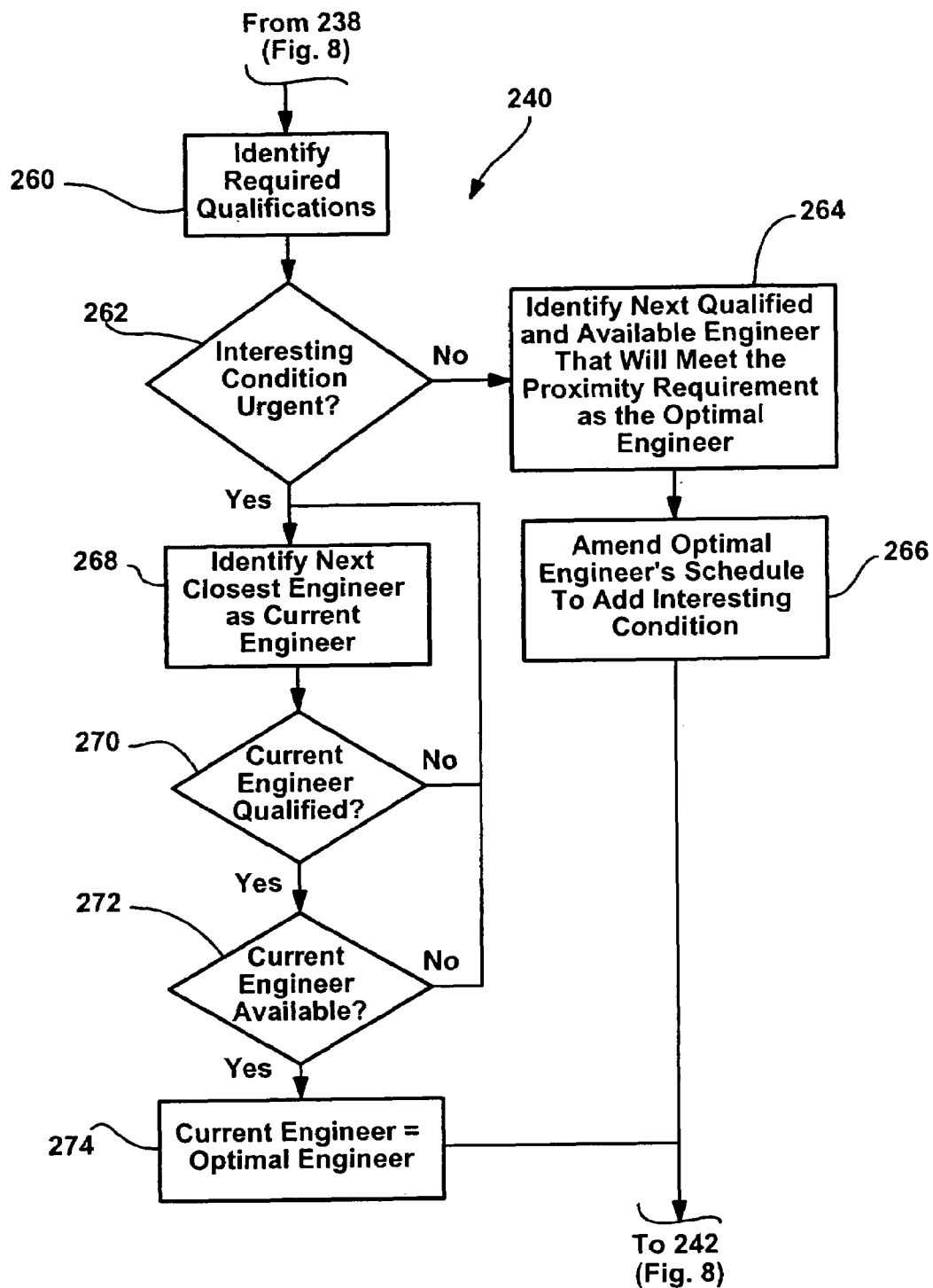
FIG. 10 is a sub-process that, like FIG. 9, may be substituted for the portion of the process illustrated in FIG. 8.

Referring to FIGS. 1, 2, 4, 5, 8 and 10, after an interesting condition has been identified at block 238 in FIG. 8 control passes to block 260 in FIG. 10. At block 260, controller 110 accesses database 170 (see again FIG. 5) and identifies the qualification set of an engineer that is qualified to address the interesting conditions as specified in column 180. After block 160, control passes to block 262 where controller 100 determine whether or not the interesting condition is urgent. Here, although not illustrated above, diagnostic database 170 may include another column that indicates specific instances of interesting conditions and whether or not those conditions are deemed to be urgent or not urgent. In this case, controller 110 uses the information in the additional column to determine whether or not a condition is urgent. Where a condition is urgent at decision block 262, control passes to block 268. Blocks 268, 270, 272 and 274 in FIG. 10 are identical to blocks 252, 254, 256, 258 in FIG. 9 and therefore, in the interest of simplifying this explanation, will not be described here in detail. Here it should suffice to say that the loop including blocks 268, 270, 272 and 274 yields an optimal engineer to be notified of an interesting condition when the interesting condition is urgent. After block 274 control passes back to block 242 in FIG. 8 where the optimal engineer is notified as described above.

Referring still to FIG. 10, and, once again to block 262, when an interesting condition that was previously identified is not considered urgent, control passes to block 264. At block 264 controller 110 identifies the next qualified and available engineer that will meet the proximity requirement as the optimal engineer. To this end, at block 264 controller 110 accesses database 140 (see again FIG. 4) and searches the location information in the day columns for each of the engineers that is qualified to address the interesting condition that occurred. Once a location in an existing schedule that is proximate the assembly at which the interesting condition occurred is identified, controller 110 amends the optimal engineer's schedule to add the interesting condition at block 266. For example, referring to FIGS. 2 and 4, where an interesting condition corresponding assembly M1 occurs at 1:00 P.M. on Monday afternoon and location L9 is proximate assembly M1, controller 110 may amend the schedule associated with the first engineer to add the interesting condition to the engineer's schedule for the 3:00 P.M. time slot (see column 160 wherein the "F" indicator in the 3:00 P.M. time slot indicates that the first engineer is free at that time). After block 266, in the illustrated method, control passes back to block 242 in FIG. 8 where the optimal engineer is notified that his schedule has been amended. This notification may indicate the time and date affected as well as the nature of the interesting condition, the assembly associated with the interesting condition, the location of the interesting condition, and so on.

Referring once again to FIG. 1, according to an additional aspect of the present invention, diagnostic controller 110 may be programmed to analyze patterns of diagnostic problems or interesting conditions that occur and, based on those patterns, to indicate when specific potentially problematic patterns are identified. For example, in FIG. 1 where a large number of interesting conditions occur in a small area within facility 102 such as, for example, in the first and second buildings 114 and 116, it may be that some environmental problem is causing the interesting conditions to occur. Hence, one potentially problematic pattern may be when more than twenty interesting conditions occur within a specific time frame within a specific sub-section of any of the facilities 102, 104, 106 or 108. Another interesting condition pattern that may be problematic may be when a certain percentage of total interesting conditions that occur within a specific facility (e.g., 102 in FIG. 1) occur within a small area of the facility. For instance, when 40% of all interesting conditions that occur within a single week occur within building number 4, that pattern may be a sign that something is wrong in building number 4.

While problematic patterns are described above in the context of a facility-wide system, it should be appreciated that similar problematic or potentially problematic patterns may be specified for sub-spaces within each or any one or a sub-set of the buildings within a facility. For example, referring also to FIG. 2, within building 114, one problematic pattern to be monitored by a diagnostic controller 110 may be whenever ten or more interesting conditions occur within 30 feet of any location within space 13. Many other problematic interesting condition patterns are contemplated by the present invention.

Figure 11:
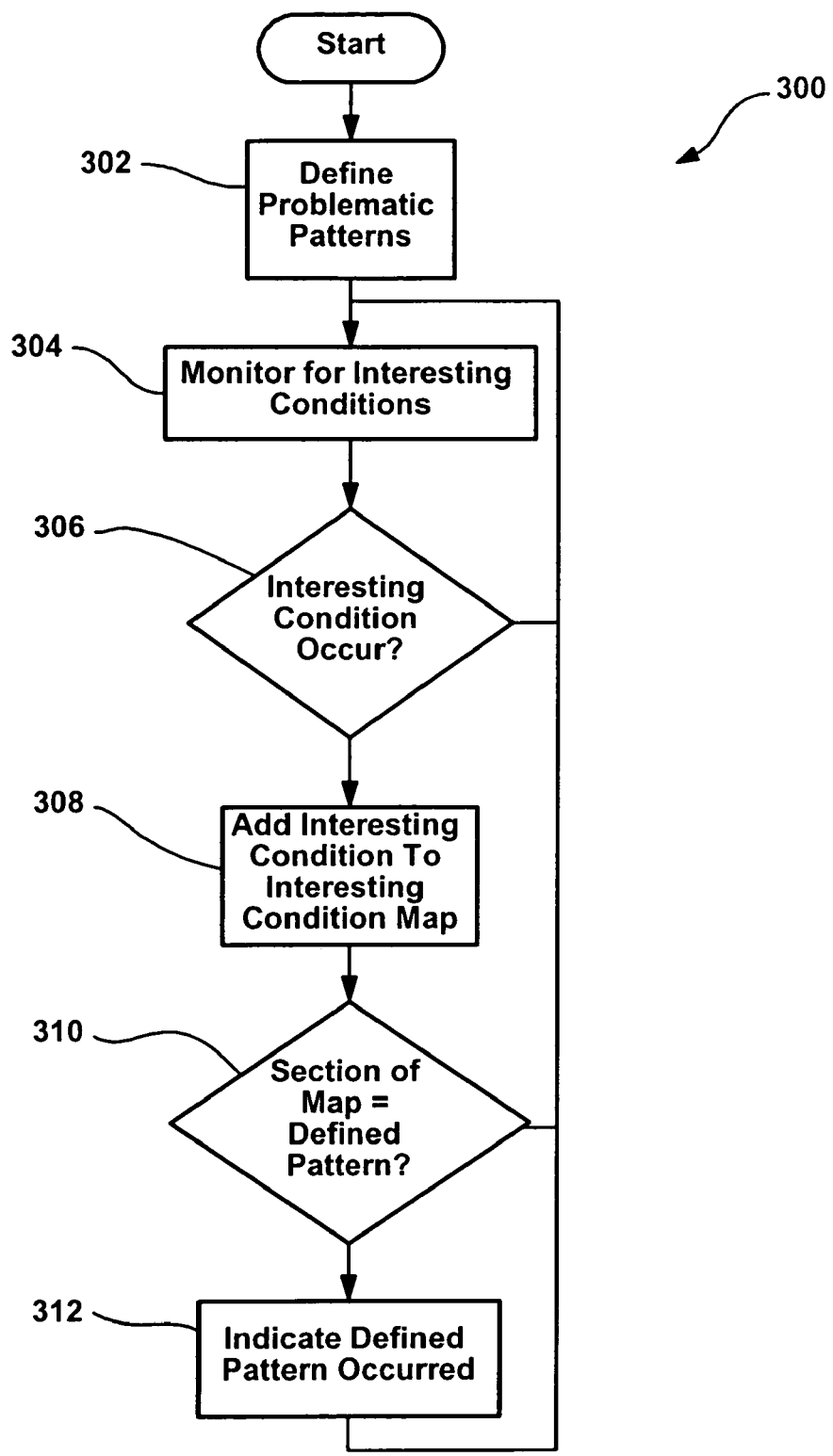
FIG. 11 is a flow chart of another method according to the present invention.

Referring now to FIG. 11, one method 300 for identifying problematic interesting condition patterns is illustrated. Referring also to FIGS. 1 and 2, at block 302, problematic patterns are defined that correspond to separate buildings (e.g., 114), facilities and, in some cases within the entire enterprise. The problematic patterns may be stored in database 350 as illustrated in FIG. 1. After block 302, control passes to block 304 where, during normal system operation, diagnostic controller 110 monitors for interesting conditions in any of the manners described above. At block 306, where no interesting condition occurs, control loops back up to block 304 where monitoring continues. At block 306 when an interesting condition occurs, control passes down to block 308 where the interesting condition that has recently occurred is added to an interesting condition map which may also be stored in database 111 (although not illustrated in FIG. 1). After block 308, at block 310, controller 110 compare the interesting condition map or, sections thereof, to the defined problematic patterns (i.e., the patterns that were defined at block 302). Where the interesting condition map or sections thereof do not match one of the defined patterns, control again loops back up to block 304 where the process as described above is repeated. At block 310, however, when the map or section thereof does match one of the defined patterns, control passes to block 312 where the defined pattern that has occurred is indicated in some manner. Here as in many of the methods as described above, indication of the occurrence of a defined pattern may include transmitting some type of a warning to a service station or, in some cases, to a qualified and available engineer within the general vicinity in which the pattern has occurred.

Figure 12:
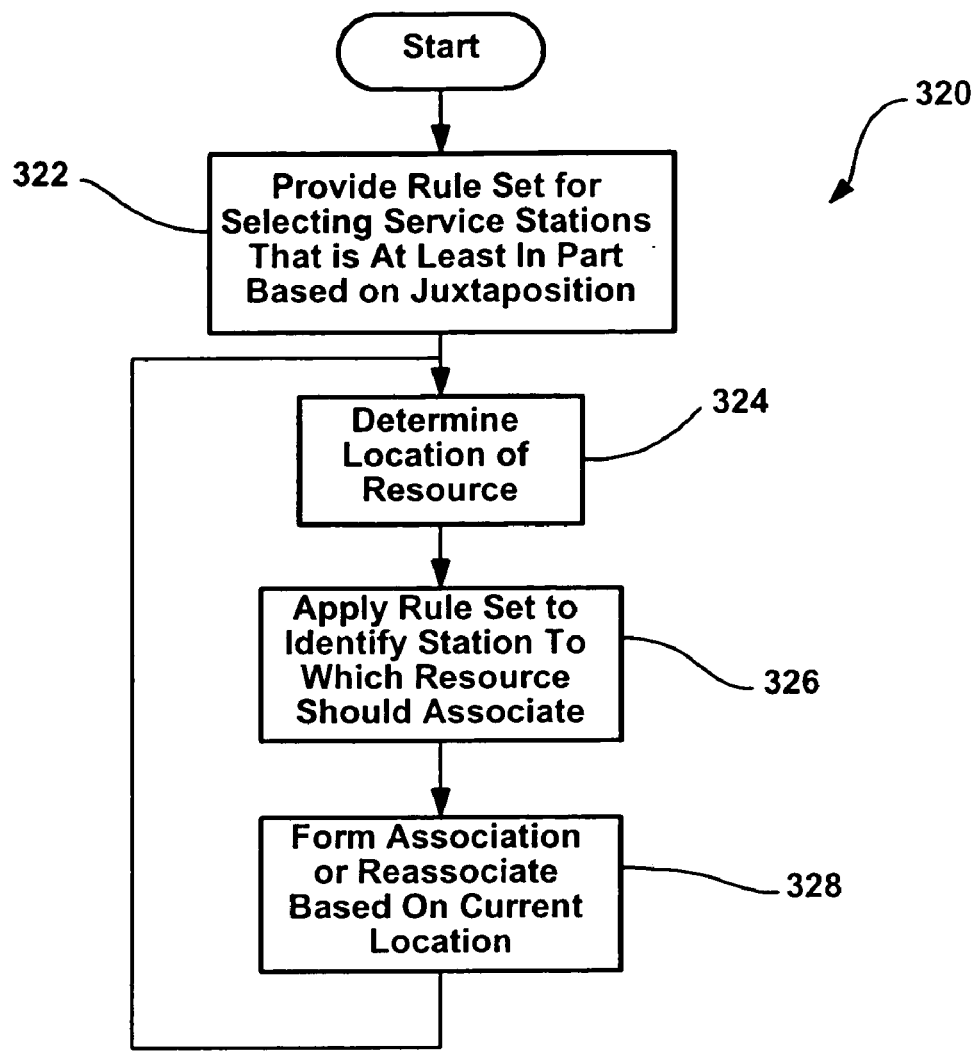
FIG. 12 is a flow chart of another method according to the present invention.

According to yet one other aspect of the present invention, in some cases it is contemplated that one or more of the assemblies within one of the buildings that comprise a facility may be mobile. For example, referring once again to FIG. 2, it may be that assembly M10 is mobile and therefore may be movable within building 114 or, through doorway 16 out of building 114 and to any other location within the first facility 102 (see again FIG. 1). In this case, while assembly M10 may have various diagnostic procedures associated therewith, the association between assembly M10 and the service stations (i.e., 169 and 171 in FIG. 2) will be altered such that the optimal service station for receiving indications of interesting conditions with respect to assembly M10 may be altered. To this end, the present invention contemplates at least one method whereby, when assembly M10 is moved within a facility or, in deed within an entire enterprise 100, association between assembly M10 and the service stations may be altered to ensure optimal association under all circumstances. To this end, one method 320 for modifying assembly/service station association as a function of location is illustrated in FIG. 12.

Referring to FIG. 12 and also again to FIGS. 1 and 2, at block 322 a rule set for selecting service stations that at least in part is based upon juxtaposition of mobile assemblies is specified. The rule set 360 may be stored in database 111 as illustrated in FIG. 1. At block 324, after an assembly M10 has been moved to a location at which assembly M10 will operate, controller 110 determines the location of the assembly. Next, at block 326, controller 110 applies the rule set to identify which station assembly M10 should be associated with for diagnostic purposes. Referring specifically to FIG. 2, where the rule set indicates that mobile assemblies should be associated with the closest service stations within the building in which the mobile assemblies are located, with assembly M10 located as illustrated, the service station selected is the second service station 171. Continuing, at block 328, controller 110 forms an association or, where assembly M10 has already been associated previously with another service station, a reassociation of assembly M10 with the optimal service station based on the current location of assembly M10. Thereafter, whenever a diagnostically interesting condition occurs at assembly M10, notice thereof is sent to second station 171.

While the invention may be susceptible to various modifications and alternative forms, specific embodiments have been shown by way of example in the drawings and have been described in detail herein. However, it should be understood that the invention is not intended to be limited to the particular forms disclosed. For example, while a WID and access points 11 are used to determine location of engineers in the exemplary system described above, it should be appreciated that other location determining systems are contemplated. For instance, when an engineer enters a facility 102 or a specific building (e.g., 114) within a facility, the engineer may be required to use a card key to gain access. Thus, general location may be determinable via most recent key access. Similarly, when an engineer addresses an interesting condition or otherwise interfaces with an assembly, the engineer may have to log onto one of the HMIs (e.g., I1–I8) and therefore HMI location may be used to determine engineer location.

In addition, in some cases a diagnostic process may require excessive time to perform such as, for instance, an entire hour. In these cases controller 110 may be programmed to analyze schedules of qualified engineers in advance to determine when an engineer will be within the general vicinity of an assembly within a specified time range and will have at least some time to address possible interesting conditions. If a time and engineer are identified, controller 110 may start the diagnostic process in advance (e.g., 1.5 hours) of the time when the engineer will be proximate and available so that any interesting conditions that occur can be addressed in a manner consistent with the engineer's schedule. Here, another factor in determining if the process should be started in advance may be a determination in advance that the engineer is on schedule. For instance, in the example above where a diagnostic process requires an hour, controller 110 may determine that an engineer that is identified to address possible interesting conditions at a first assembly is located at a location consistent with the engineers schedule one hour prior to the time at which the engineer is free to address first assembly conditions. Here, in at least some cases controller 110 may not commence the diagnostics processes for the first assembly if the engineer is off schedule.

In addition, another factor when determining whether or not diagnostic processes should commence may be current status of an assembly. For instance, where a diagnostic process requires that a machine's normal operating schedule be interrupted, it may not be optimal to alter normal operations due to resulting downtime. Here, the pre-scheduling concepts described above are particularly important.

Furthermore, it is contemplated that any facility engineer may desire to receive specific interesting condition notices associated with specific assemblies independent of whether or not the engineer is the optimal engineer at a subsequent time. For instance, if one engineer has dealt with a specific interesting condition often in the past it may be suitable for that engineer to address the condition when it occurs again or to at least be consulted regarding the next occurrence. Here, to support this concept, an exceptions field (e.g., one labeled 370 in FIG. 4) may be provided in each of the engineer sub-databases (e.g., 142 in FIG. 4) that stores data indicating exceptions selected via the specific engineer. In FIG. 4 exemplary exceptions are indicated via assembly indicators although more specific and separate interesting condition indicators are contemplated.

In addition, while the examples above assume generally that diagnostic processes are commenced after triggering relationships occur or after a time period has expired, it is also contemplated that diagnostic processes and data gathering may be continual and that triggering relationships simply kick off summary processes or the final steps in the diagnostic processes. For instance, in some cases a triggering relationship may simply call for transmission of summary diagnostic results or current results. In other cases a triggering relationship may commence performance of an algorithm on historically collected and archived data to identify interesting conditions and then notice thereof.

Moreover, while specific orders of process steps are described above, it should be understood that in many cases the order of steps may be altered. For example, in FIG. 7, the order of decision blocks 206 and 208 may be switched. Other step orders are contemplated.

Furthermore, in some cases it may be that when an interesting condition occurs and notice is provided to a specific optimal engineer, affirmative acceptance of the task of addressing the condition has to be indicated by the engineer within a given accept period or else a next most optimal engineer will be identified and given notice. To this end, a sub-process 378 that may be substituted for blocks 238 through 246 in FIG. 8 is illustrated in FIG. 13.

Figure 13:
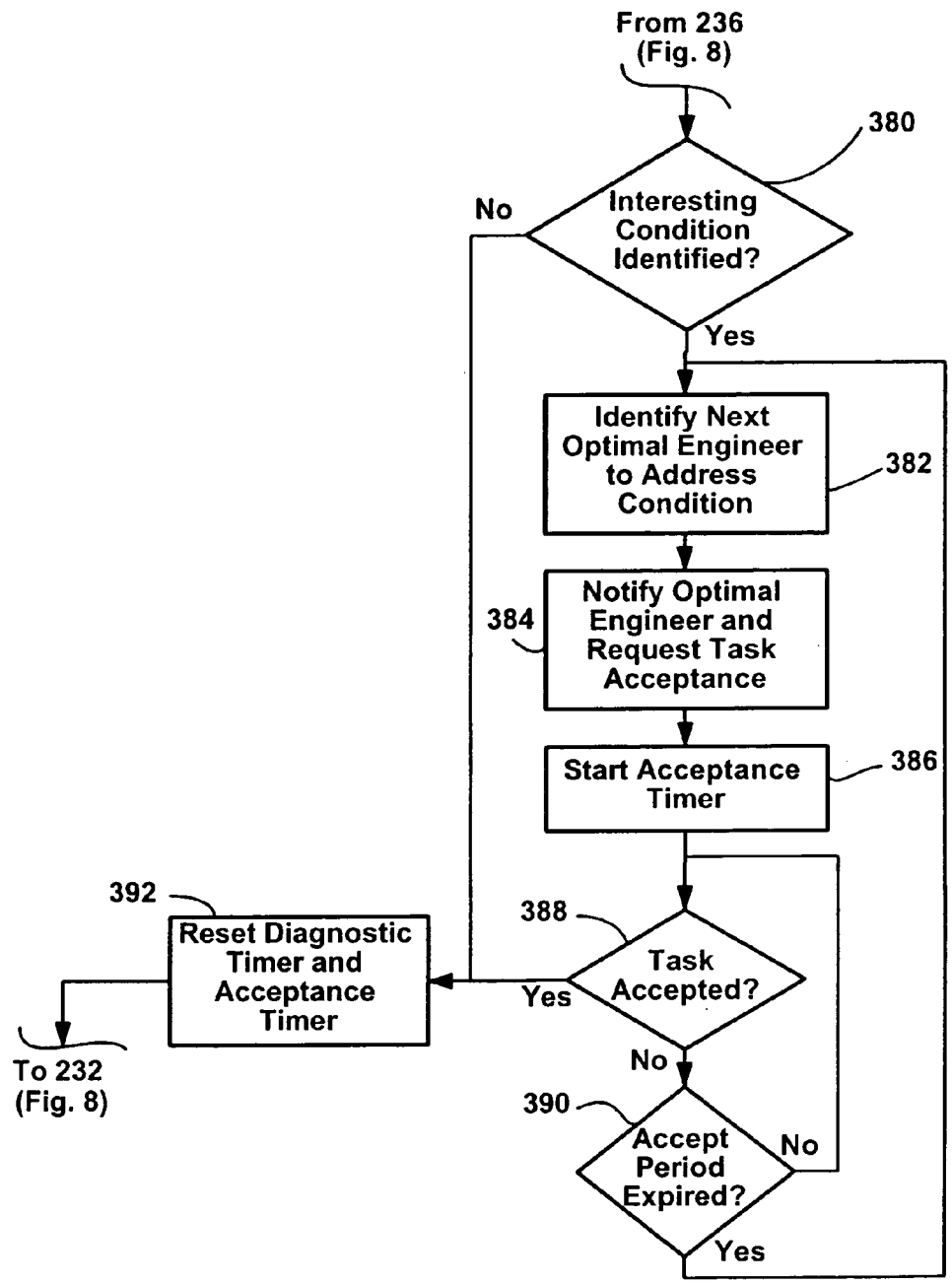
FIG. 13 is a flow chart illustrating one additional sub-process that may be substituted for a portion of the process illustrated in FIG. 8.

Referring also to FIGS. 1, 2 and 8, after a diagnostic process has been performed at block 236, control passes to block 380 in FIG. 13. At block 380, controller 110 determines whether or not an interesting condition has been identified. Where no interesting condition has been identified, control passes to block 392 where the diagnostic timer is reset and, also, a second timer, referred to herein as an acceptance timer, is also reset. The acceptance timer, as described hereinafter, is a timer that tracks the time since an optimal engineer has been notified of the occurrence of an interesting condition.

Referring again to block 380, where an interesting condition has been identified, control passes to block 382. At block 382, controller 110 identifies the next optimal engineer based on whatever criteria have been specified for making that identification. At block 384 the optimal engineer is notified of the interesting condition and, as part of the notification, a query is provided to the optimal engineer requesting that the optimal engineer affirmatively accept responsibility for addressing the condition. Here, the task request may comprise presentation of a request to the engineer via the engineer's WID 30 along with selectable accept and reject icons provided on display 34.

Continuing, at block 386 the acceptance timer is turned on. At block 388, controller 110 determines whether or not an indication has been received from the optimal engineer that the optimal engineer has accepted the task. Where the task is accepted, control passes to block 392 where, again, the diagnostic and acceptance timers are both reset. At block 388, where the task has not been accepted, control passes to block 390. At block 390, controller 110 determines whether or not the accept period has expired. Where the accept period has not expired, control passes back up to block 388 where the loop described above is repeated. Where the accept period has expired at block 390, control loops back up to block 382 where a next optimal engineer is identified and the process above continues. Once the diagnostic and acceptance timers have been reset at block 392, control passes back to block 232 in FIG. 8.

In the claims that follow the term "operation" is sometimes used to refer to an enterprise process where one type of enterprise process may be an operating assembly. Other enterprise processes may include monitoring of process temperatures, pressures, volumes and so on. Thus, the term "operation" is used to express a broader concept than a simple mechanical and/or electronic assembly.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for use with an enterprise operation and at least one processor programmed to perform at least one diagnostic process on the operation and to at least periodically perform at least one summary process on the operation, the method for commencing the at least one summary process and comprising the steps of:

specifying at least one triggering relationship between at least a first enterprise user and the operation that is to automatically initiate the at least one summary process;

determining when the at least one triggering relationship occurs; and when the at least one triggering relationship occurs, automatically causing the processor to perform the at least one summary process.

2. The method of claim 1 wherein the at least one summary process includes analyzing the results of the at least one diagnostic process.

3. The method of claim 2 wherein the at least one summary process also includes, when the analyzing step results in at least one interesting condition, performing another process.

4. The method of claim 3 wherein the another process is at least one of another diagnostic process and a summary process.

5. The method of claim 3 wherein the step of performing another process includes indicating that an interesting condition has occurred.

6. The method of claim 1 wherein the at least one summary process includes indicating at least a sub-set of the results of the at least one diagnostic process.

7. The method of claim 6 wherein the step of indicating includes providing an interface to at least the first user and indicating the at least a sub-set of results to the first user via the interface.

8. The method of claim 1 wherein the triggering relationship also initiates the at least one diagnostic process.

9. The method of claim 8 wherein the at least one summary process includes the steps of analyzing the results of the at least one diagnostic process to identify interesting conditions.

10. The method of claim 9 further including the step of, wherein when an interesting condition is identified, indicating that an interesting condition has occurred.

11. The method of claim 1 wherein the at least one triggering relationship specifies a first relative juxtaposition of the operation and the first enterprise user.

12. The method of claim 11 further including the steps of monitoring a period since the last performance of the at least one summary process, performing the at least one summary process at least once every Y hours independent of the occurrence of the at least one triggering relationship and, after the at least one triggering relationship occurs, resetting the period.

13. The method of claim 11 further including the step of monitoring the period since the last performance of the at least one summary process wherein the at least one triggering relationship specifies that the at least one summary process should be performed when the first user and the assembly are in the first relative juxtaposition and when the period since the last performance of the at least one process exceeds X hours.

14. The method of claim 1 further including the step of, after the at least one summary process has been completed, indicating completion.

15. The method of claim 11 wherein the step of determining includes providing an information device to the at least a first user and at least one sensor for sensing location of the information device and determining location of the information device via interaction between the information device and the at least one sensor.

16. The method of claim 15 wherein the step of providing an information device and at least one sensor includes providing a wireless information device (WID) and at least one access point and wherein the step of determining location includes transmitting signals from at least one of the WID and the access point to the other of the WID and the access point and using the transmitted signals to determine location.

17. The method of claim 16 further including the step of, after the at least one summary process has been completed, indicating completion.

18. The method of claim 17 wherein the step of indicating completion includes providing an indication to the at least a first user via transmission from the at least one access point to the WID.

19. The method of claim 16 further including the steps of, when the at least one summary process identifies an interesting condition, performing a function.

20. The method of claim 19 wherein the step of performing a function includes indicating the interesting condition to the at least one user via the WID.

21. The method of claim 11 wherein a plurality of users use the enterprise, the step of determining including determining if at least one of the enterprise users is in the specified relative juxtaposition to the assembly and, where at least one of the users is in the specified relative juxtaposition, determining if the user in the specified juxtaposition is the first user and, where the user in the specified juxtaposition is the first user, determining that the triggering relationship has occurred.

22. The method of claim 11 wherein a plurality of users use the enterprise and wherein the at least one triggering relationship includes relationships with at least a sub-set of the enterprise users where each sub-set user is characterized by a triggering characteristic set, the step of determining including determining if at least one of the enterprise users is in the specified relative juxtaposition to the assembly and, where at least one of the users is in the specified relative juxtaposition, determining if the user in the specified juxtaposition is characterized by the triggering characteristic set.

23. The method of claim 22 wherein the triggering characteristic set includes qualification to use at least one summary process results.

24. The method of claim 23 wherein the triggering characteristic set includes availability to examine summary process results and wherein the step of determining further includes accessing a schedule database that indicates the schedules of the enterprise users and determining if the user in the specified relative juxtaposition is currently unoccupied.

25. The method of claim 1 wherein the operation includes an automated assembly.

26. The method of claim 1 wherein the operation is a communication network.

27. The method of claim 1 wherein the summary process is at least one of a batch process, a safety process, a redundancy process and a security process.

28. A method for use with an enterprise operation and at least one processor programmed to perform at least one diagnostic process on the operation and to at least periodically perform at least one summary process on the operation, the method for commencing the at least one summary process and comprising the steps of:

specifying at least a first relative juxtaposition of the operation and a qualified enterprise user that is to automatically initiate the at least one summary process wherein the qualified user is any user that is qualified to use the results of the at least first summary process;

determining when at least one qualified user is in the at least first relative juxtaposition with respect to the operation; and when at least one qualified user is in the at least first relative juxtaposition with respect to the operation, causing the processor to perform the at least one summary process.

29. The method of claim 28 wherein the summary process also includes determining if the qualified user that is in the at least first relative juxtaposition with respect to the operation is unoccupied and, when the user is unoccupied, performing at least a summary sub-process.

30. The method of claim 29 wherein the summary sub-process includes determining if the diagnostic results include at least one interesting condition and, when the results include at least one interesting condition, indicating the interesting condition to the user.

31. The method of claim 28 further including the step of, when at least one qualified user is in the at least first relative juxtaposition with respect to the operation, obtaining information about the user, the step of causing the processor to perform including causing the processor to identify at least one summary process as a function of the identity of the obtained information about the user and performing the one summary process.

32. The method of claim 31 wherein the step of obtaining information includes identifying the user.

33. A method for use with a plurality of operations that are spaced out within a facility, the method for identifying when at least one interesting condition occurs within the facility and comprising the steps of:

specifying at least a first pattern of diagnostically interesting incidences that correspond to the at least one interesting condition where the at least a first pattern is at least in part related to relative juxtapositions of the diagnostically interesting incidences;

performing diagnostic processes related to each of the operations and identifying diagnostically interesting incidences;

when a diagnostically interesting incident is identified, identifying the relative juxtapositions of the identified incident with respect to at least a sub-set of previously identified diagnostically interesting incidences;

comparing the relative juxtapositions to the at least a first pattern; and where the relative juxtapositions match the at least a first pattern, indicating that the first pattern has occurred.

34. The method of claim 33 wherein the step of specifying at least a first pattern includes specifying a space size and a number of diagnostically interesting incidences that have to occur within the space size for the at least a first pattern to occur.

35. The method of claim 33 wherein the step of identifying the relative juxtapositions includes providing a diagnostics map corresponding to the facility and indicating the locations of the diagnostically interesting incidences on the diagnostics map.

36. A method for use with an enterprise operation and at least one processor linked to the operation, the method for requesting service from a most optimal enterprise user when at least one interesting condition related to the operation occurs, the method comprising the steps of:

monitoring the operation for at least one diagnostically interesting condition;

when at least one diagnostically interesting condition is identified, identifying at least one of the enterprise users as the most optimal user to address the diagnostically interesting condition; and indicating the most optimal user.

37. The method of claim 36 wherein the step of identifying includes identifying the enterprise user that is most proximate the operation.

38. The method of claim 37 wherein the step of identifying the most proximate user includes providing a wireless information device to each enterprise user, determining the juxtapositions with respect to the operation of at least a sub-set of the WIDs and comparing the relative juxtapositions.

39. The method of claim 38 further including the step of providing at least one stationary access point within the enterprise, the step of determining the relative juxtaposition of each of the sub-set of WIDs including transmitting signals from one of the WID and the at least one access point to the other of the WID and the at least one access point, using the transmitted signals to determine the location of the WID with respect to the operation and comparing the WID locations.

40. The method of claim 37 wherein the step of identifying includes identifying a sub-set of the users that is qualified to address the diagnostically interesting condition and selecting one of the qualified users as the, most optimal user.

41. The method of claim 40 wherein the step of selecting includes selecting the one of the qualified users that is most proximate the operation.

42. The method of claim 41 wherein the step of identifying the most proximate user includes providing a wireless information device (WID) to each enterprise user, determining the juxtapositions with respect to the operation of at least a sub-set of the WIDs and comparing the relative juxtapositions.

43. The method of claim 42 further including the step of providing at least one stationary access point within the enterprise, the step of determining the relative juxtaposition of each of the sub-set of WIDs including transmitting signals from one of the WID and the at least one access point to the other of the WID and the at least one access point, using the transmitted signals to determine the location of the WID with respect to the operation and comparing the WID locations.

44. The method of claim 36 wherein the step of identifying includes accessing a schedule database that indicates the schedules of the enterprise users.

45. The method of claim 44 wherein the step of identifying further includes identifying a sub-set of the enterprise users that is currently unoccupied and selecting one of the unoccupied users as the most optimal user.

46. The method of claim 44 wherein the enterprise includes sub-spaces and the operation is within a first sub-space and wherein the step of identifying further includes identifying the one of the enterprise users that is next scheduled to be within the first sub-space.

47. The method of claim 46 further including the step of amending the schedule of the user that is next scheduled to be within the first sub-space to include an appointment to address the interesting condition.

48. The method of claim 46 wherein the at least one diagnostically interesting condition is one of a malfunction and an unexpected occurrence.

49. The method of claim 40 wherein the step of selecting includes accessing a schedule database that indicates the schedules of the enterprise users, using the schedule database to identify relative availability of the qualified users and selecting the most available user as the optimal user.

50. The method of claim 36 further including the step of providing notice to the optimal user that the at least one interesting condition has occurred.

51. The method of claim 50 wherein the step of providing notice includes amending a schedule for the optimal user to add an appointment to address the interesting condition.

52. The method of claim 51 wherein the step of amending a schedule includes requesting acceptance of the appointment from the optimal user and, when the appointment is accepted, amending the schedule.

53. The method of claim 52 wherein the step of requesting acceptance includes starting a timer after requesting acceptance and, after a query period expires, identifying the next most optimal user to address the interesting condition and indicating the next most optimal user.

54. The method of claim 52 wherein, when the appointment is rejected, the method further includes the step of identifying the next most optimal user to address the interesting condition and indicating the next most optimal user.

55. The method of claim 36 wherein the step of identifying includes identifying the enterprise user that most recently addressed the interesting condition for the specific assembly.

56. The method of claim 36 wherein the step of identifying includes identifying the enterprise user that has the most experience addressing the interesting condition.

57. The method of claim 36 wherein the step of identifying includes identifying the enterprise user that has had the most success addressing the interesting condition.

58. The method of claim 36 wherein the enterprise includes a plurality of operations and wherein the step of identifying includes identifying the enterprise user that most recently addressed the interesting condition for any of the enterprise operations.

59. The method of claim 36 wherein the operation includes an automated assembly.

60. The method of claim 36 wherein the operation is a communication network.

61. The method of claim 36 wherein the summary process is at least one of a batch process, a safety process, a redundancy process and a security process.

62. A method for use with an assembly to be located within an enterprise, the method for associating the assembly with an optimal service resource for reporting diagnostically interesting incidences related to the assembly, the method comprising the steps of:
   positioning at least a first service resource within the enterprise;
   positioning the assembly within the enterprise;
   automatically identifying an optimal one of the service resources for monitoring assembly operations based at least in part on the relative juxtaposition of the assembly to each of the first and second service resources;
   monitoring the assembly for the occurrence of at least one diagnostically interesting incident; and
   when a diagnostically interesting incident occurs, indicating the incident to the optimal one of the service resources.

63. The method of claim 62 wherein the step of identifying the optimal one of the service resources includes the step of determining which of the services resources is closest to the assembly.

64. An apparatus for use with an enterprise operation and at least one processor programmed to perform at least one diagnostic process on the operation and to at least periodically perform at least one summary process on the operation, the method for commencing the at least one summary process, the apparatus comprising:
   a database specifying at least one triggering relationship between at least a first enterprise user and the operation that is to automatically initiate the at least one summary process; and
   a processor programmed to perform the steps of:
   determining when the at least one triggering relationship occurs; and
   when the at least one triggering relationship occurs, automatically performing the at least one summary process.

65. The apparatus of claim 64 wherein the at least one diagnostic process is performed routinely and wherein the processor performs the at least one summary process by analyzing the results of the at least one diagnostic process.

66. The apparatus of claim 64 wherein the processor performs the at least one summary process by, when the analyzing step results in at least one interesting condition, performing another process.

67. The apparatus of claim 66 wherein the processor performs another process by indicating that an interesting condition has occurred.

68. The apparatus of claim 64 wherein the processor performs the at least one summary process by indicating at least a sub-set of the results of the at least one diagnostic process.

69. The apparatus of claim 68 wherein the processor indicates by providing an interface to at least the first user and indicating the at least a sub-set of results to the first user via the interface.

70. The apparatus of claim 64 wherein the processor also initiates the at least one diagnostic process when the triggering relationship occurs.

71. The apparatus of claim 70 wherein the processor performs the at least one summary process by analyzing the results of the at least one diagnostic process to identify interesting conditions and, when an interesting condition is identified, indicating that an interesting condition has occurred.

72. The apparatus of claim 64 wherein the at least one triggering relationship specifies a first relative juxtaposition of the operation and the first enterprise user.

73. The apparatus of claim 72 wherein the processor is also programmed to monitor a period since the last performance of the at least one summary process, perform the at least one summary process at least once every Y hours independent of the occurrence of the at least one triggering relationship and, after the at least one triggering relationship occurs, reset the period.

74. The apparatus of claim 72 wherein the processor is also programmed to monitor a period since the last performance of the at least one summary process wherein the at least one triggering relationship specifies that the at least one summary process should be performed when the first user and the operation are in the first relative juxtaposition and when the period since the last performance of the at least one process exceeds X hours.

75. The apparatus of claim 64 wherein the processor is also programmed to, after the at least one summary process has been completed, indicating completion.

76. The apparatus of claim 72 for use with an information device used by the at least a first user, the further including at least one sensor for sensing location of the information device and wherein the processor is programmed to determine location of the information device via interaction between the information device and the at least one sensor.

77. The apparatus of claim 76 wherein the information device includes a wireless information device (WID) and the sensor is at least one access point, the WID and sensor cooperate by transmitting signals from at least one of the WID and the access point to the other of the WID and the access point and wherein the processor determines location via the transmitted signals.

78. The apparatus of claim 77 wherein the processor, after the at least one summary process has been completed, indicating completion.

79. The apparatus of claim 78 wherein the processor indicates by providing an indication to the at least a first user via transmission from the at least one access point to the WID.

80. The apparatus of claim 77 wherein the processor, when the at least one summary process identifies an interesting condition, performs a function.

81. The apparatus of claim 80 wherein the processor performs a function by indicating the interesting condition to the at least one user via the WID.

82. The apparatus of claim 72 wherein a plurality of users use the enterprise, the processor determining by determining if at least one of the enterprise users is in the specified relative juxtaposition to the operation and, where at least one of the users is in the specified relative juxtaposition, determining if the user in the specified juxtaposition is the first user and, where the user in the specified juxtaposition is the first user, determining that the triggering relationship has occurred.

83. The apparatus of claim 72 wherein a plurality of users use the enterprise and wherein the at least one triggering relationship includes relationships with at least a sub-set of the enterprise users where each sub-set user is characterized by a triggering characteristic set, the processor determining by determining if at least one of the enterprise users is in the specified relative juxtaposition to the operation and, where at least one of the users is in the specified relative juxtaposition, determining if the user in the specified juxtaposition is characterized by the triggering characteristic set.

84. The apparatus of claim 83 wherein the triggering characteristic set includes qualification to use at least one summary process results.

85. The apparatus of claim 84 wherein the triggering characteristic set includes availability to examine summary process results and wherein the processor determines by accessing a schedule database that indicates the schedules of the enterprise users and determining if the user in the specified relative juxtaposition is currently unoccupied.

86. The apparatus of claim 64 wherein the operation is an automated assembly.

87. An apparatus for use with an enterprise operation and at least one processor programmed to perform at least one diagnostic process on the operation and to at least periodically perform at least one summary process on the operation, the apparatus for commencing the at least one summary process and comprising:
providing a database that specifies at least a first relative juxtaposition of the operation and a qualified enterprise user that is to automatically initiate the at least one summary process wherein the qualified user is any user that is qualified to use the results of the at least first summary process; and
a processor programmed to perform the steps of:
determining when at least one qualified user is in the at least first relative juxtaposition with respect to the operation; and
when at least one qualified user is in the at least first relative juxtaposition with respect to the operation, performing the at least one summary process.

88. The apparatus of claim 87 wherein the summary process also includes determining if the qualified user that is in the at least first relative juxtaposition with respect to the operation is unoccupied and, when the user is unoccupied, performing at least a summary sub-process.

89. The apparatus of claim 88 wherein the summary sub-process includes determining if the diagnostic results include at least one interesting condition and, when the results include at least one interesting condition, indicating the interesting condition to the user.

90. An apparatus for use with an enterprise operation and at least one processor linked to the operation, the apparatus for requesting service from a most optimal enterprise user when at least one interesting condition related to the operation occurs, the apparatus comprising:
a processor programmed to perform the steps of:
monitoring the operation for at least one diagnostically interesting condition;
when at least one diagnostically interesting condition is identified, identifying at least one of the enterprise users as the most optimal user to address the diagnostically interesting condition; and
indicating the most optimal user.

91. The apparatus of claim 90 wherein the processor identifies by identifying the enterprise user that is most proximate the operation.

92. The apparatus of claim 91 further including a wireless information device provided to each enterprise user wherein the processor identifies the most proximate user by determining the juxtapositions with respect to the operation of at least a sub-set of the WIDs and comparing the relative juxtapositions.

93. The apparatus of claim 92 further including at least one stationary access point within the enterprise, the at least one access point and device cooperating by transmitting signals from one of the WID and the at least one access point to the other of the WID and the at least one access point, the processor identifying by using the transmitted signals to determine the location of the WID with respect to the operation and comparing the WID locations.

94. The apparatus of claim 92 wherein the step of identifying includes identifying a sub-set of the users that is qualified to address the diagnostically interesting condition and selecting one of the qualified users as the most optimal user.

95. The apparatus of claim 94 wherein the step of selecting includes selecting the one of the qualified users that is most proximate the operation.

96. The apparatus of claim 95 wherein the step of identifying the most proximate user includes providing a wireless information device (WID) to each enterprise user, determining the juxtapositions with respect to the operation of at least a sub-set of the WIDs and comparing the relative juxtapositions.

97. The apparatus of claim 96 further including the step of providing at least one stationary access point within the enterprise, the step of determining the relative juxtaposition of each of the sub-set of WIDs including transmitting signals from one of the WID and the at least one access point to the other of the WID and the at least one access point, using the transmitted signals to determine the location of the WID with respect to the operation and comparing the WID locations.

98. The apparatus of claim 90 further including the step of providing an enterprise user schedule database that indicates the schedules of the enterprise users and wherein the step of identifying includes accessing a schedule database.

99. The apparatus of claim 98 wherein the step of identifying further includes identifying a sub-set of the enterprise users that is currently unoccupied and selecting one of the unoccupied users as the most optimal user.

100. The apparatus of claim 98 wherein the enterprise includes sub-spaces and the operation is within a first sub-space and wherein the step of identifying further includes identifying the one of the enterprise users that is next scheduled to be within the first sub-space.

101. The apparatus of claim 100 further including the step of amending the schedule of the user that is next scheduled to be within the first sub-space to include an appointment to address the interesting condition.

102. The apparatus of claim 100 wherein the at least one diagnostically interesting condition is one of a malfunction and an unexpected occurrence.

103. The apparatus of claim 94 further including an enterprise user schedule database that indicates the schedules of the enterprise users and wherein the step of selecting includes accessing a schedule database, using the schedule database to identify relative availability of the qualified users and selecting the most available user as the optimal user.

104. The apparatus of claim 90 wherein the processor also provides notice to the optimal user that the at least one interesting condition has occurred.

105. The apparatus of claim 104 wherein the step of providing notice includes amending a schedule for the optimal user to add an appointment to address the interesting condition.

106. The apparatus of claim 105 wherein the step of amending a schedule includes requesting acceptance of the appointment from the optimal user and, when the appointment is accepted, amending the schedule.

107. The apparatus of claim 106 wherein the step of requesting acceptance includes starting a timer after requesting acceptance and, after a query period expires, identifying the next most optimal user to address the interesting condition and indicating the next most optimal user.

108. The apparatus of claim 106 wherein, when the appointment is rejected, the apparatus further includes the step of identifying the next most optimal user to address the interesting condition and indicating the next most optimal user.

109. The apparatus of claim 90 wherein the step of identifying includes identifying the enterprise user that most recently addressed the interesting condition for the specific assembly.

110. The apparatus of claim 90 wherein the operation is an automated assembly.

* * * * *